(12) United States Patent
Handa et al.

(10) Patent No.: US 11,121,881 B2
(45) Date of Patent: Sep. 14, 2021

(54) EVENT COMMUNICATION AND VERIFICATION THROUGH A BLOCKCHAIN NETWORK

(71) Applicant: Visa International Service Association, San Francisco, CA (US)

(72) Inventors: Sukrit Handa, San Mateo, CA (US); Suman Mukherjee, Foster City, CA (US); Timothy P. Tidwell, San Mateo, CA (US); Ajith Thekadath, San Ramon, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 365 days.

(21) Appl. No.: 16/249,823

(22) Filed: Jan. 16, 2019

(65) Prior Publication Data

US 2019/0229926 A1 Jul. 25, 2019

Related U.S. Application Data

(60) Provisional application No. 62/619,679, filed on Jan. 19, 2018.

(51) Int. Cl.
*H04L 9/32* (2006.01)
*H04L 9/30* (2006.01)
(52) U.S. Cl.
CPC ............. *H04L 9/3247* (2013.01); *H04L 9/30* (2013.01); *H04L 2209/38* (2013.01); *H04L 2209/56* (2013.01)
(58) Field of Classification Search
CPC ..... H04L 9/3247; H04L 9/30; H04L 2209/38; H04L 2209/56
USPC .................................................. 713/136, 176
See application file for complete search history.

(56) References Cited

U.S. PATENT DOCUMENTS

| 2017/0134280 | A1  | 5/2017  | Davis |
|---|---|---|---|
| 2017/0237554 | A1  | 8/2017  | Jacobs |
| 2017/0323294 | A1  | 11/2017 | Rohlfing et al. |
| 2017/0357966 | A1  | 12/2017 | Chandrasekhar et al. |
| 2017/0372308 | A1* | 12/2017 | Metnick ............ G06Q 20/3829 |

FOREIGN PATENT DOCUMENTS

| EP | 3259725 | 12/2017 |
|---|---|---|
| KR | 20070103721 | 10/2007 |
| KR | 101701131 | 2/2017 |

OTHER PUBLICATIONS

PCT/US2019/013863, "International Search Report and Written Opinion", dated May 14, 2019, 14 pages.
Application No. EP19741200.0, Extended European Search Report, dated Feb. 16, 2021, 9 pages.

\* cited by examiner

*Primary Examiner* — Michael S McNally
(74) *Attorney, Agent, or Firm* — Kilpatrick Townsend & Stockton LLP

(57) ABSTRACT

A method for verifying that event can take place before the event is executed is disclosed. A verification system is incorporated into an event processing network, such that the verification system can identify newly proposed events and determine whether they can be completed. The verification system can inform the network about verification results through distributed blockchain records. Other changes in event status can also be communicated through and stored in blockchain records.

20 Claims, 13 Drawing Sheets

EVENT COMMUNICATION AND VERIFICATION THROUGH A BLOCKCHAIN NETWORK

CROSS REFERENCE TO RELATED APPLICATIONS

This application is a non-provisional application of and claims the benefit of the filing date of U.S. Provisional Application No. 62/619,679, filed on Jan. 19, 2018, which is herein incorporated by reference in its entirety for all purposes.

SUMMARY

Embodiments of the invention provide systems and methods for tracking and recording event statuses through multiple linked blockchain record entries. For example, an event proposal or promise can be recorded in a blockchain at a first time, then a verification that the event can be completed can be recorded in the blockchain at a second time, and then an event completion can be recorded in the blockchain at a third time. The various records can all be linked to a single event, for example via an event identifier.

Additionally, embodiments allow a verification system to be incorporated into the blockchain network, where the verification system is capable of verifying whether an event can be completed. As a result, the verification system can detect when an event has been proposed, can separately verify whether the event can be completed based on event information, and can then post an update to the blockchain that the event can be completed.

Accordingly, embodiments enable the creation of successive immutable records related to an event, such that concerned parties can be informed about the status of the event and about the likelihood that the event will be completed.

One embodiment of the invention is directed to a method. The method comprises receiving, from a computer in a blockchain network, a first data package for an event and a first digital signature associated with the first data package. The first data package includes an event identifier and event information. The method further includes verifying the first digital signature using a public key, and generating a first block for a blockchain stored by the verification system. The first block includes the first data package and the first digital signature. The method also comprises verifying that the event can be completed based on the event information, and in response to verifying that the event can be completed, generating a second data package for the event and generating a second digital signature for the second data package using a private key associated with the verification system. The second data package includes the event identifier and information indicating that the event has been verified. The method also includes generating a second block for the blockchain, and transmitting the second data package and the second digital signature to one or more computers in the blockchain network. The second block includes the second data package and the second digital signature.

Another embodiment of the invention is directed to a verification system configured to perform the above-described method.

Further details regarding embodiments of the invention can be found in the Detailed Description and the Figures.

DETAILED DESCRIPTION

Figure 1:
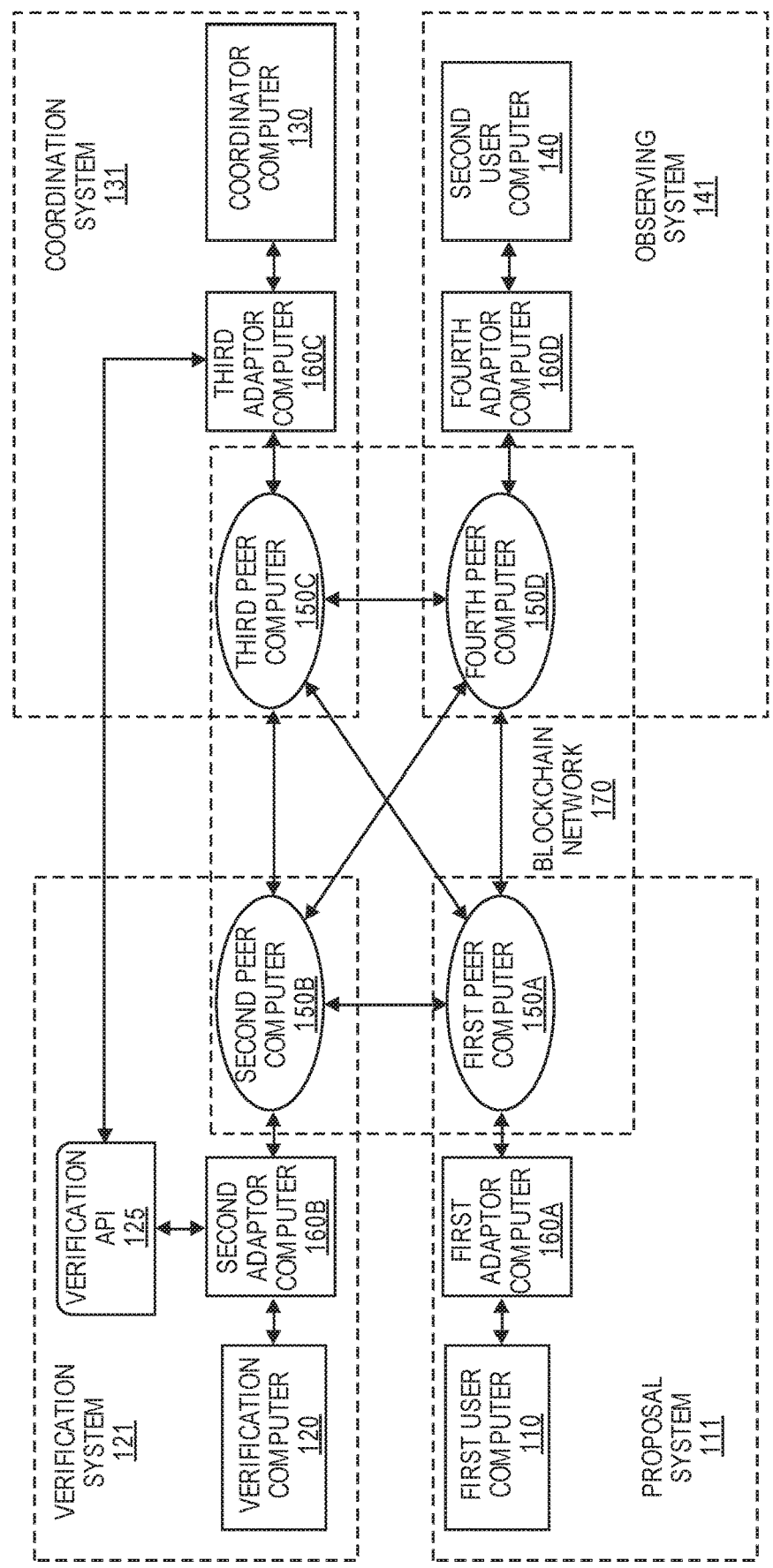
FIG. 1 shows a block diagram of a system according to an embodiment of the invention.

Embodiments of the present invention provide systems and methods for verifying whether an event can be completed before the event takes place. Embodiments provide an event processing network that is restructured to include a verification computer and to distribute communications to several parties.

For example, a verification computer of a verification entity, such as a settlement bank, can be incorporated into an event processing network in order to assist with event processing. When an event, such as a payment transaction, is first proposed to a network, the verification computer can receive information about the event, and can determine whether the event can be completed as described. For example, a settlement bank can determine whether a payment sender has sufficient funds in a settlement account to support a proposed payment transaction. The verification computer can then inform the network about whether the event has been verified as capable of being completed.

As a result, participants in the network can be informed about the chances that a proposed event can or will be completed before the event actually takes place. This provides assurance to the network participants (e.g., a payment receiver) that otherwise in the past have not had assurance about an event until the event is actually completed, and this enables network participants to take further actions as if the event is already completed.

Embodiments of the invention additionally allow network participants to be communicatively connected through a blockchain network. As a result, event processing communications can be distributed throughout the network through blockchain record updates and consensus processes. This streamlines communication and efficiency, as immutable and distributed records can be created as a by-product of distributing information about an event.

Embodiments of the invention allow a change in event status, or any suitable information about an event, to be recorded in the distributed blockchain records. Various event-related records can be linked to the same event by including a unique event identifier. As a result, network participants can be quickly informed about a new event proposal, an event verification, an event completion, and any other suitable aspect of event processing.

Additional features that can be included in embodiments of the invention are described in the International Application US2017/046364, in International Application US2017/059744, and in the International Application US2018/027455, each of which are incorporated by reference herein in their entirety for all purposes.

Prior to discussing specific embodiments of the invention, some terms may be described in detail.

An "event" may include an occurrence or a happening. Examples of events include a service being performed (e.g., a construction project or medical procedure), a value transfer taking place (e.g., a payment transaction or a transfer of access privileges), and a new achievement (e.g., an academic accomplishment).

An event may be described by "event information." Event information can include a type of event (e.g., a transaction, a new achievement, a service, a meeting, a performance, etc.), an event time (e.g., date, start time, end time, day of the week, moment of transaction, etc.), an event location, people or organizations associated with the event, a transaction amount, or any other suitable information. An event can be recorded in a database by storing event information in the database.

An "event identifier" may be a sequence of characters used to identify an event. For example, an event identifier can include an alphanumeric code, a graphical representation, or any other suitable symbol that can represent an event.

A "data package" may be a collection of digital information. For example, a data package can be information that exists in binary format. In some embodiments, a data package can include information about anything that can be described in a record, such as an event. For example, a data package can include any suitable type of digital event information and event status update information, such as transaction data, activity data, ownership data, verification data, event completion data, product status and update data, etc.

The term "peer" may be a connection point. In some embodiments, a peer may be a physical electronic device that is capable of creating, receiving, verifying, storing, or transmitting data. In other embodiments, a peer may be a software module on a computing device, the software module being a connection point in a communication network. In some embodiments, a peer may be a computing device within a record-keeping network. A peer may be able to receive a data package, verify a digital signature, add a data package to a blockchain record, receive a data package from an adaptor or other peers, validate a data package, and/or perform any other suitable functions. Different types of peers may be able to perform different sets of functions within a recording network. In some embodiments, a peer may be associated with and/or operated by a financial institution computer (e.g., a bank), a payment processor computer, verification system, a third party computer, or any other suitable entity.

The term "ledger of transactions" may be a compilation of data from previous transactions. The ledger of transactions may be a database or other comparable file structure that may be configured to store data from all previous transactions, including the date and time of a transaction, the transaction amount, and identification information for the participants of the transaction (e.g., the sender and the receiver of the transaction amount). In some embodiments, the ledger of transactions may be in the form of an electronic ledger (e.g., blockchain) in which data already stored in the electronic ledger is unalterable.

A "blockchain" can be a database that maintains a continuously-growing list of records secured from tampering and revision. A blockchain may include a number of blocks of event records recorded by one or more peers. Each block in the blockchain can contain also include a timestamp and a link to a previous block. For example, each block may include a hash of the previous block. Stated differently, event records in a blockchain may be stored as a series of "blocks," or permanent files that include a record of a number of events occurring over a given period of time. Blocks may be appended to a blockchain by an appropriate peer after it completes the block and the block is validated. In embodiments of the invention, a blockchain may be distributed, and a copy of the blockchain may be maintained at each peer in a blockchain network.

A "key pair" may include a pair of linked cryptographic keys. For example, a key pair can include a public key and a corresponding private key. In a key pair, a first key (e.g., a public key) may be used to encrypt a message, while a second key (e.g., a private key) may be used to decrypt the encrypted message. Additionally, a public key may be able to verify a digital signature created with the corresponding private key. The public key may be distributed throughout a network in order to allow for verification of messages signed using the corresponding private key. Public and private keys may be in any suitable format, including those based on RSA or elliptic curve cryptography (ECC). In some embodiments, a key pair may be generated using an asymmetric key pair generation algorithm. However, a key pair may also be generated using other means, as one of ordinary skill in the art would understand.

The term "digital signature" may be an electronic signature for a message. A digital signature may be a numeric data value, an alphanumeric data value, or any other type of data. In some embodiments, a digital signature may be a unique data value generated from a message (or data packet) and a private key using a cryptographic algorithm. In some embodiments, a validation algorithm using a public key may be used to verify the signature.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers.

FIG. 1 shows a system 100 comprising a number of components. The system 100 comprises a recording network includes a number of participating entities. The first user computer 110 operated by a first user (not shown) can submit new record information for an event that concerns a second user (not shown) that operates a second user computer 140. The verification computer 120 verifies that that the event can be completed, and the coordinator computer 130 causes the event to be executed.

The first user computer 110, the second user computer 140, the verification computer 120, and the coordinator computer 130 can be referred to as endpoint computers. Each endpoint computer can be associated with a respective adaptor computer and peer computer. The peer computers 150A-D and adaptor computers 160A-D can serve as network gateways and nodes for each endpoint computer. Embodiments allow an endpoint computer, a respective adaptor computer, and a respective peer computer to be combined into one computer. However, they are shown separately in FIG. 1 in order to illustrate different processes that can be performed. For example, an endpoint computer can perform functions such as ordering, verifying, and executing transactions, an adaptor computer can perform functions such as creating and signing data packages, and a peer computer can perform functions such as creating blocks and distributing new blocks and/or data packages to other peer computers.

As mentioned above, the peer computers 150A-D can communicate with one another in order to distribute and store new records. The adaptor computers 160A-D can create new data packages for submission to the peer computers 150A-D, and can monitor the records at the peer computers 150A in order to report events back to the first user computer 110, the second user computer 140, the verification computer 120, and the coordinator computer 130. All of the computers shown in the system 100 may be in operative communication with each other through any suitable communication channel or communications network. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

Messages between the computers, networks, and devices may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

The system 100 may be used to record any suitable type of information. For example, the system 100 can be used to record information about a proposed event, an event verification, and/or an event completion. Information can be recorded about any suitable type of event, such as projects, activities, payment transactions, new medical patient data, and academic achievements.

As shown in FIG. 1, the system 100 includes a blockchain network 170 which includes the first peer computer 150A, the second peer computer 150B, the third peer computer 150C, and the fourth peer computer 150D. Embodiments allow the blockchain network 170 to include any suitable number of peer computers. The peer computers 150A-D can create records and distribute information to one another.

The peer computers 150A-D also serve to communicatively connect one or more participating systems and endpoints within the system 100. For example, the system 100 shows a proposal system 111 connected to the blockchain network 170 through the first peer computer 150A, a verification system 121 connected to the blockchain network 170 through the second peer computer 150B, a coordination system 131 connected to the blockchain network 170 through the third peer computer 150C, and an observing system 141 connected to the blockchain network 170 through the fourth peer computer 150D.

Each of these systems include an endpoint computer (e.g., the first user computer 110, the verification computer 120, the coordinator computer 130, and the second user computer 140). The adaptor computers 160A-D can serve as an interface between respective endpoint computers and the peer computers 150A-D. The peer computers 150A-D and adaptor computers 160A-D are discussed in more detail below, with respect to FIGS. 2-3.

In addition to recording information, the system 100 enables the various endpoint computers to communicate about events through the blockchain network 170. For example, the first user computer 110 can propose a new event for recording to the rest of the endpoint computers through the blockchain network 170. Other endpoints can receive information about the proposed event through the blockchain network 170, can perform additional functions, then can communicate additional event-related information through the blockchain network 170.

The first user computer 110 can instruct the first adaptor computer 160A and the first peer computer 150A to create, record, and distribute a new data package with event information for a proposed event, such as a payment transaction between the first user computer 110 and the second user computer 140. Thus, the first user computer 110, the first adaptor computer 160A, and the first peer computer 150A, can, in combination, propose a new event to the rest of the system 100. Accordingly, the first user computer 110, the first adaptor computer 160A, and the first peer computer 150A can, in combination, be referred to as a proposal system 111.

In some embodiments, the first user computer 110 can provide additional services beyond initiating new events within the system 110. For example, the first user computer 110 can be a computer associated with a financial institution, a hospital, a government agency, an academic institution, a mobile phone service provider, or any other suitable service provider. Accordingly, in some embodiments, the first user computer 110 can maintain accounts on behalf of one or more individuals or organizations. Such an account may store identity information, medical records, academic records, financial information, or any other suitable details depending on the type of service provider.

In embodiments where the first user computer 110 is associated with a financial institution, the first user computer 110 may maintain accounts with monetary value. The first user computer 110 may also be able to send (and/or receive) value to other financial institutions. An example of a financial institution is an issuer, which may typically be a business entity (e.g., a bank) that issues and maintains an account (e.g., a bank account) for an individual or organization.

The verification system 121 can include the verification computer 120, the second adaptor computer 160B, the second peer computer 150B, and/or the verification API 125. The verification system 121 can be configured to verify whether an event can be completed. For example, the second adaptor computer 160B can be configured to inform the verification computer 120 when a new event has been proposed (e.g., based on new records received and stored by the second peer computer 150B). The verification computer 120 can then determine whether the first user computer 110 has allocated sufficient resources (e.g., monetary funds, personnel, reserved space, work hours) to complete the event. The verification computer 120 can also cause additional information to be recorded, such as information about whether the event has been verified (e.g., whether the event can be completed).

In some embodiments, the verification computer 120 can be a settlement computer associated with a settlement bank. The settlement bank can maintain settlement accounts on behalf of the first user, the second user, and/or any other entities. As a result, the settlement computer can determine whether the settlement account has been sufficiently funded to complete a payment transaction proposed by the first user computer 110. In other embodiments, the verification computer 120 can communicate with one or more external banks, and can thereby determine whether an account is sufficiently funded.

The verification API 125 can be configured to communicate more directly with the coordinator computer 130, such that the verification system 121 and the coordinator system 131 can communicate without going through the blockchain network 170. For example, the verification API 125 can transmit communications between the second adaptor computer 160B and the third adaptor computer 160C. Alternatively, in some embodiments, the verification API 125 can transmit communications directly between the verification computer 120 and the coordinator computer 130.

The coordination system 131 can include the coordinator computer 130, the third adaptor computer 160C, and/or the third peer computer 150C. The coordination system 131 can be configured to coordinate the execution of an event. For example, the third adaptor computer 160C can be configured to inform the coordinator computer 130 when a new event has been verified (e.g., based on new records received and stored by the third peer computer 150C). The coordinator computer 130 can then take one or more actions in order to cause the event to be executed. For example, the coordinator computer 130 can transmit a message to one or more computers, instructing execution of the event. The coordinator computer 130 can also cause additional information to be recorded, such as information about whether the event has been completed.

In some embodiments, the coordinator computer 130 can be a transaction processing computer associated with a transaction processing network. A transaction processing network may refer to an electronic payment system used to accept, transmit, or process transactions made by payment devices for money, goods, or services. The processing network may transfer information and funds among authorization entities (e.g., issuers), acquirers, merchants, and payment device users. In embodiments where the coordinator computer 130 is a transaction processing computer, the coordinator computer 130 can send a transaction message to a settlement bank to trigger settlement of a proposed transaction between two accounts. Thus, in some embodiments, the coordinator computer 130 can transmit a message to the verification computer 120 and thereby cause the verification computer 120 to perform the event (e.g., settle a value between two accounts).

In some embodiments, the coordinator computer 130 can coordinate and oversee the record-keeping processes in the system 100. For example, the coordinator computer 130 can monitor and regulate activities taking place in the network. The coordinator computer 130 can define channel rules such as a consensus policy, establish a smart contract, determine what entities can be included in the network, etc. The coordinator computer 130 can also use the third peer computer 150C to regulate the behavior of participating peers in order to keep the transaction records secure and reliable.

In some embodiments, the blockchain network 170 can represent a single blockchain network channel, and additional network channels may exist (e.g., with a different set of peer computers). A "network channel" can include a set of peer computers, adaptor computers, and/or endpoint computers. A network channel can be a subdivision of a larger network, where the network channel is set aside for interactions between a specific set of entities. For example, the peer computers shown in FIG. 1 can make up one network channel created for transactions between the first user computer 110 and the second user computer 140. Another network channel can be created for interactions between the first user computer 110 and a third user computer (not shown), and such a network channel can include a fifth peer (not shown) computer in place of the fourth peer computer 150D. Different network channels can be regulated by different rules for interacting and creating records, and can otherwise be customized.

The coordinator computer 130 and/or coordination system 131 may participate in multiple blockchain network channels, overseeing the activities of each network channel. Additionally, in some embodiments, the coordinator computer 130 can create new network channels and coordinate enrollment of peer computers, endpoint computers, and users into a new network channel.

The observing system 141 can include the second user computer 140, the fourth adaptor computer 160D, and/or the fourth peer computer 150D. The observing system 141 can be configured to update local records in response to an event being completed. For example, the fourth adaptor computer 160D can be configured to inform the second user computer 140 when a new event has been completed (e.g., based on new records received and stored by the fourth peer computer 150D). The second user computer 140 can then update local records based on the completed event. For example, the second user computer 140 can update a local account, such as the account of an individual or organization (e.g., by crediting the account with a transaction value).

By participating in the blockchain network 170, the observing system 141 can receive information about event statuses and progress that have been immutably stored throughout the network. This enables the second user computer 140 to be quickly informed about event proposals, event verifications, and event completions. The reports of the verification computer 120 can provide assurance to the second user computer 140 that a proposed event can and will be completed as specified in the proposal. Accordingly, the second user computer 140 may actively monitor the statuses and progress of an event as indicated by each successive data packet. In some embodiments, the second user computer 140 can update local records before the event completion, such as in response to an event being verified by the verification computer 120.

Similar to the first user computer 110, the second user computer 140 can also be associated with a service provider such as a bank. As a result, the second user computer 140 can maintain one or more accounts (e.g., on behalf of individuals and organizations, and the second user computer 140 can store and receive a value for such accounts. As an example the second user computer 140 can be associated with an acquirer, which may typically be a business entity (e.g., a commercial bank) that has a business relationship with a particular merchant or other entity. Some entities can perform both issuer and acquirer functions. Some embodiments may encompass such single entity issuer-acquirers.

The first user computer 110 is primarily described herein as submitting event proposals and transaction values. Also, the second user computer 140 is primarily described herein as monitoring event statuses and receiving transaction values. However, in some embodiments, the second user computer 140 can include some or all of the functionality described above with respect to the first user computer 110, and the first user computer 110 can include some or all of the functionality described with respect to the second user computer 140.

Additionally, each of the peer computers 150A-D and the adaptor computers 160A-D are primarily described herein as performing a certain set of tasks. However, embodiments allow any peer computer to perform any function described herein with respect to any other peer computer, and embodiments allow any adaptor computer to perform any function described herein with respect to any other adaptor computer. Further, a peer computer and/or adaptor computer may participate in more than one blockchain network channel, and may perform different functions and roles across different network channels.

In some embodiments, the architecture of the blockchain network 170 and other aspects of the system 100 can be implemented using Hyperledger Fabric, Hyperledger Composer, and/or any other suitable blockchain network tools.

Figure 2:
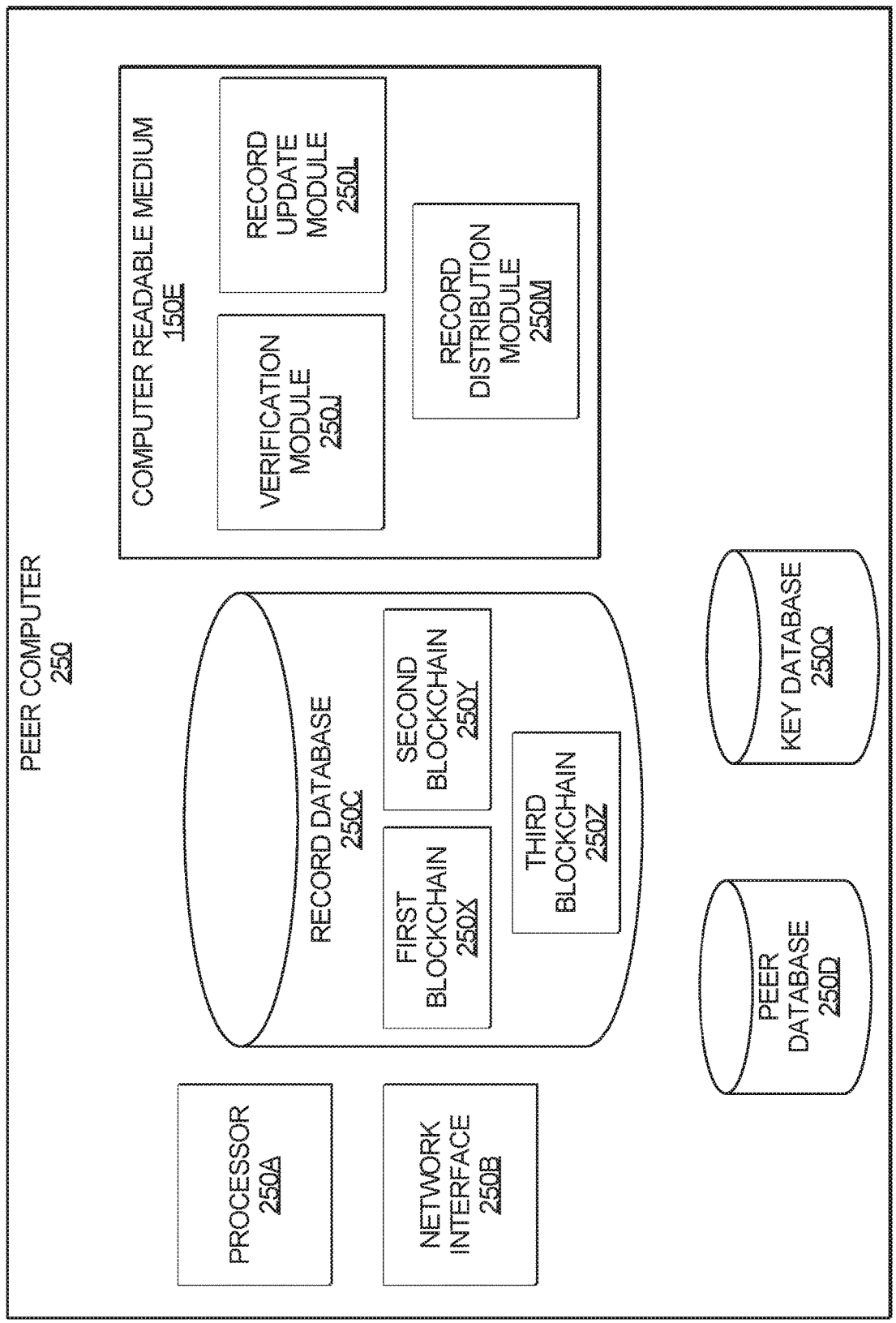
FIG. 2 shows an example block diagram of a peer computer, according to an embodiment of the invention.

An example of a peer computer 250, according to some embodiments of the invention, is shown in FIG. 2. The peer computer 250 comprises a processor 250A, a network interface 250B, a record database 250C, a peer database 250D, a key database 250Q, and a computer readable medium 250E.

The record database 250C can store records. For example, data packets received from an adaptor computer and/or other peer computers in the network can be inserted into a record and stored in the record database 250C. In some embodiments, the records can take the form of a blockchain with block records, each block including one or more data packages. Multiple data packets across multiple blocks can be associated with a single event. For example, a single event can be associated with a first data packet with event information, a second data packet with event verification data, and a third data packet with event completion data.

The peer computer 250 can participate in multiple blockchain network channels, and events can be separated based on the network channel in which the events take place. Accordingly, separate blockchains can be built for each network channel, and the peer computer 250 can maintain a synchronized copy of each blockchain for each network channel in which the peer computer 250 participates. For example, as shown in FIG. 2, the record database 250C can include a first blockchain 250X for a first network channel, a second blockchain 250Y for a second network channel, a third blockchain 250Z for a third network channel, and any other suitable number of additional blockchains.

The peer database 250D can include information about network channels and peer computers within each network channel. For example, the peer database 250D can include a list of network channels in which the peer computer 250 participates, and a list of other peer computers that are associated with each respective network channel. The peer database 250D can also include unique identifiers for each network channel and for each associated peer computer.

The key database 250Q can store cryptographic keys. For example, the key database 250Q can store a different public key for each different participant (e.g., peer computer and/or system) in the network channel. In some embodiments the key database 250Q can take the form of a hardware security module (HSM).

The computer readable medium 250E may comprise a verification module 250J, a record update module 250L, a record distribution module 250M, and any other suitable software module. The computer readable medium 250E may also comprise code, executable by the processor 250A for implementing a method comprising receiving, from a computer in a blockchain network, a first data package for an event and a first digital signature associated with the first data package, the first data package including an event identifier and event information; verifying the first digital signature using a public key; generating a first block for a blockchain stored by the verification system, the first block including the first data package and the first digital signature; verifying that the event can be completed based on the event information; in response to verifying that the event can be completed, generating a second data package for the event, the second data package including the event identifier and information indicating that the event has been verified; generating a second digital signature for the second data package using a private key associated with the verification system; generating a second block for the blockchain, the second block including the second data package and the second digital signature; and transmitting the second data package and the second digital signature to one or more computers in the blockchain network.

The verification module 250J may comprise code that causes the processor 250A to verify the authenticity of one or more digital signatures. For example, the verification module 250J may contain logic that causes the processor 250A to use a certain peer computer's public key to verify the authenticity of a digital signature associated with that peer computer and/or an associated system.

The verification module 250J may further contain logic that causes the processor 250A to otherwise verify that a new data package is authentic and can be entered in the records. For example, the peer computer 250 can verify that a data package is associated with a known network channel, and verify that all entities associated with the data package are registered with the network and have been screened for compliance. The peer computer 250 can also verify that event information in a data package does not exceed velocity thresholds or otherwise violate specific network channel rules.

The record update module 250L may comprise code that causes the processor 250A to maintain and update a set of records. For example, the record update module 250L may contain logic that causes the processor 250A to record information about a new event (e.g., as indicated in a new data package). In some embodiments, the record update module 250L may include instructions for including a new data package (e.g., and associated digital signatures) in the next blockchain block. One or more data packages can be included in a block, and the peer computer 250 can create a header and/or digital signature for a new block.

The record distribution module 250M may comprise code that causes the processor 250A to distribute information about events to other peer computers in a blockchain network channel. For example, the record distribution module 250M may contain logic that causes the processor 250A to transmit messages to one or more other peer computers, the messages containing one or more data packages, digital signatures, and/or blocks. Accordingly, a network of peer computers can inform one another when a transaction status is updated.

The record distribution module 250M may further contain logic that causes the processor 250A to communicate with other peer computers in the blockchain network channel in order to reach consensus about updated blockchain contents and structure. For example, two or more peer computers can communicate in order to determine data packages to include in a new block, and/or about the structure and/or header of a new block to add to the blockchain.

Embodiments allow the peers computers to communicate to achieve consensus about changes to the record using any suitable consensus algorithm, such practical byzantine fault tolerance algorithm (PBFT), a proof-of-work algorithm (PoW), a proof-of-stake algorithm (PoS), or a delegated proof-of-stake algorithm (DPoS). Also, the minimum level of consensus can be customized for a specific network channel. For example, a network channel may require 100% consensus, or a network channel may require that at least peer computers associated with the coordinator computer 130 and the verification computer 120 achieve consensus.

Figure 3:
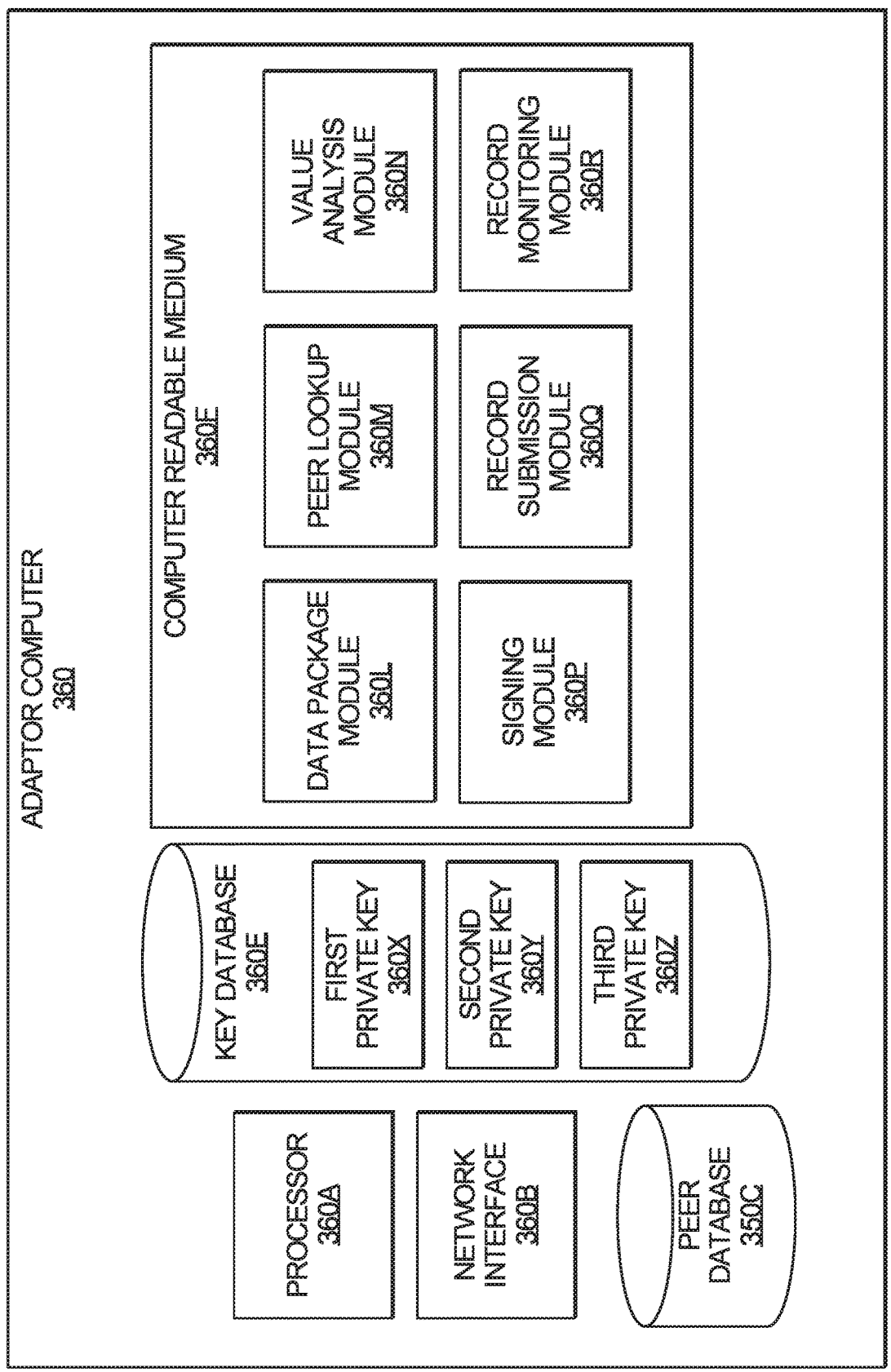
FIG. 3 shows an example block diagram of an adaptor computer, according to an embodiment of the invention.

An example of an adaptor computer 360, according to some embodiments of the invention, is shown in FIG. 3. The adaptor computer 360 comprises a processor 360A, a network interface 360B, a peer database 360P, a key database 360E, and a computer readable medium 360F.

The key database 360E can store cryptographic keys. For example, the key database 360E can include one or more private keys associated with the adaptor computer 360 and/or an associated peer computer and endpoint computer. In some embodiments, the key database 360E can include a different private key for each network channel in which the adaptor computer 360 is associated. For example, as shown in FIG. 3, the key database 360E can include a first private key 360X for signing data packages associated with a first network channel, a second private key 360Y for signing data packages associated with a second network channel, a third private key 360Z for signing data packages associated with a third network channel, and any other suitable number of additional private keys. In some embodiments the key database 360E can take the form of a hardware security module (HSM).

The peer database 360C can include information about network channels and peer computers within each network channel. For example, the peer database 360C can include a list of network channels with which the adaptor computer 350 is associated, and a list of peer computers that are associated with each respective network channel. The peer database 360C can further include information about user computers (and other endpoint computers) and the peer computers with which they are associated. The peer database 360C can include unique identifiers for each network channel and for each associated peer computer.

The computer readable medium 360F may comprise a data package module 360L, a peer lookup module 360M, a value analysis module 360N, a signing module 360P, a record submission module 360Q, a record monitoring module 360R, and any other suitable software module.

The data package module 360L may comprise code that causes the processor 360A to generate a new data package. For example, the data package module 360L may contain logic that causes the processor 360A to receive an instruction from an endpoint computer (e.g., the first user computer 110, the verification computer 120, or the coordinator computer 130), and to create a data package associated with an event. The data package can include any suitable information for entering into a new record. For example, a data package can include event information about a proposed event, verification information indicating whether or not the event can be completed, and/or completion information indicating that the event has been successfully completed. A data package can also include an event identifier, identifiers for an associated network, identifiers for associated user computers, identifiers for associated peer computers, and/or any other suitable information. In the example of payment transactions, a data package with event information can include information about the sending account, the receiving account, a transaction amount, the sending currency, the receiving currency, a currency exchange rate, fee information, an invoice number (e.g., for an invoice sent by the second user computer 140 to the first user computer 110), a purchase order number, a timestamp, and/or any other suitable information.

The peer lookup module 360M may comprise code that causes the processor 360A to identify one or more peer computers based on a data package. For example, the peer lookup module 360M may contain logic that causes the processor 360A to identify a network channel and/or one or more associated peer computers based on event information in a data package. For example, a second user computer 140 and/or a fourth peer computer 150D can be identified based on the identity of a second user, as indicated in the data package. In another example, a network channel and set of peer computers can be identified based on the identities of a payment sender and payment recipient, as indicated in the data package. The peer lookup module 360M can also include instructions for adding one or more determined identifiers to a data package.

The value analysis module 360N may comprise code that causes the processor 360A to determine a value for a transaction. For example, the value analysis module 360N may contain logic that causes the processor 360A to determine a first amount in a first currency that will be charged to the first user computer 110 in order to deliver a second amount in a second currency to the second user computer 140. This determination can include looking up a current foreign exchange rate and calculating transfer fees. The amount debited in the first currency, the amount credited in the second currency, the currency exchange rate, and/or the fees assessed can be included in a new data package.

The signing module 360P may comprise code that causes the processor 360A to create a digital signature. For example, the signing module 360P may contain logic that causes the processor 360A to apply a private key and a mathematical algorithm to a data package, such that the digital signature is generated for the data package.

The record submission module 360Q may comprise code that causes the processor 360A to submit a new data package for recording. For example, the record submission module 360Q may contain logic that causes the processor 360A to transmit a new data package, an associated digital signature, and/or any other suitable information to a peer computer (e.g., a peer computer associated with the adaptor computer 360).

The record monitoring module 360R may comprise code that causes the processor 360A to monitor records for new data. For example, the record submission module 360R may contain logic that causes the processor 360A to regularly scan and parse records stored at an associated peer computer for new data packages. The record monitoring module 360R may further include instructions for detecting and reporting certain types of data packages to an associated endpoint computer. For example, the adaptor computer 360 may be specifically configured to detect and report data packages with event information for newly proposed events, data packages with information indicating that an event has been verified as capable of being completed, and/or data packages with information indicating that an event has been completed.

Peer computers and their associated adaptor computers are primarily described herein as being separate computers. However, embodiments allow a peer computer, an adaptor computer, and/or an endpoint computer to be combined into a single computer, and for that combined computer to include software modules for each of the functions described above. For example, some or all components of the verification system 121 shown in FIG. 1 can be embodied as a single computer.

As mentioned above, referring back to FIG. 1, the blockchain network 170 may represent of a single network channel within a larger network. Other network channels can exist that include a different set of peer computers and participants. Embodiments allow any other suitable number of separate network channels to exist within the larger network. A separate network channel with a separate ledger, a customized smart contract, and other specialized rules (e.g., privacy rules) can be established for each user-to-user (e.g., bank-to-bank) relationship. Additionally, two users (e.g., banks) may have separate network channels with different rules for interacting in different regions or areas with different rules (e.g., a first network channel for interactions in Europe and a second network channel for interactions in North America).

Each network channel can include just the sending and receiving entities (e.g., the first user computer 110 and the second user 140), as well as other necessary participants for processing a transaction (e.g., the verification computer 120 and the coordinator computer 130). As a result, only entities which were involved with the processing of a transaction may have access to the transaction records, thereby protecting sensitive information by limiting access.

As mentioned above, in some embodiments, the recording system may utilize a blockchain. Each block in the blockchain may include information about one or more events (e.g., from one or more data packages, digital signatures, etc.). A blockchain ledger may be unalterable without detection. This ensures that any tampering of information related to transactions, such as an attempt to reassign a transaction value to an inappropriate entity, will not go unnoticed. Together, a block header and a block body that includes the transaction information (e.g., and any other suitable information) can make up a block.

Figure 4:
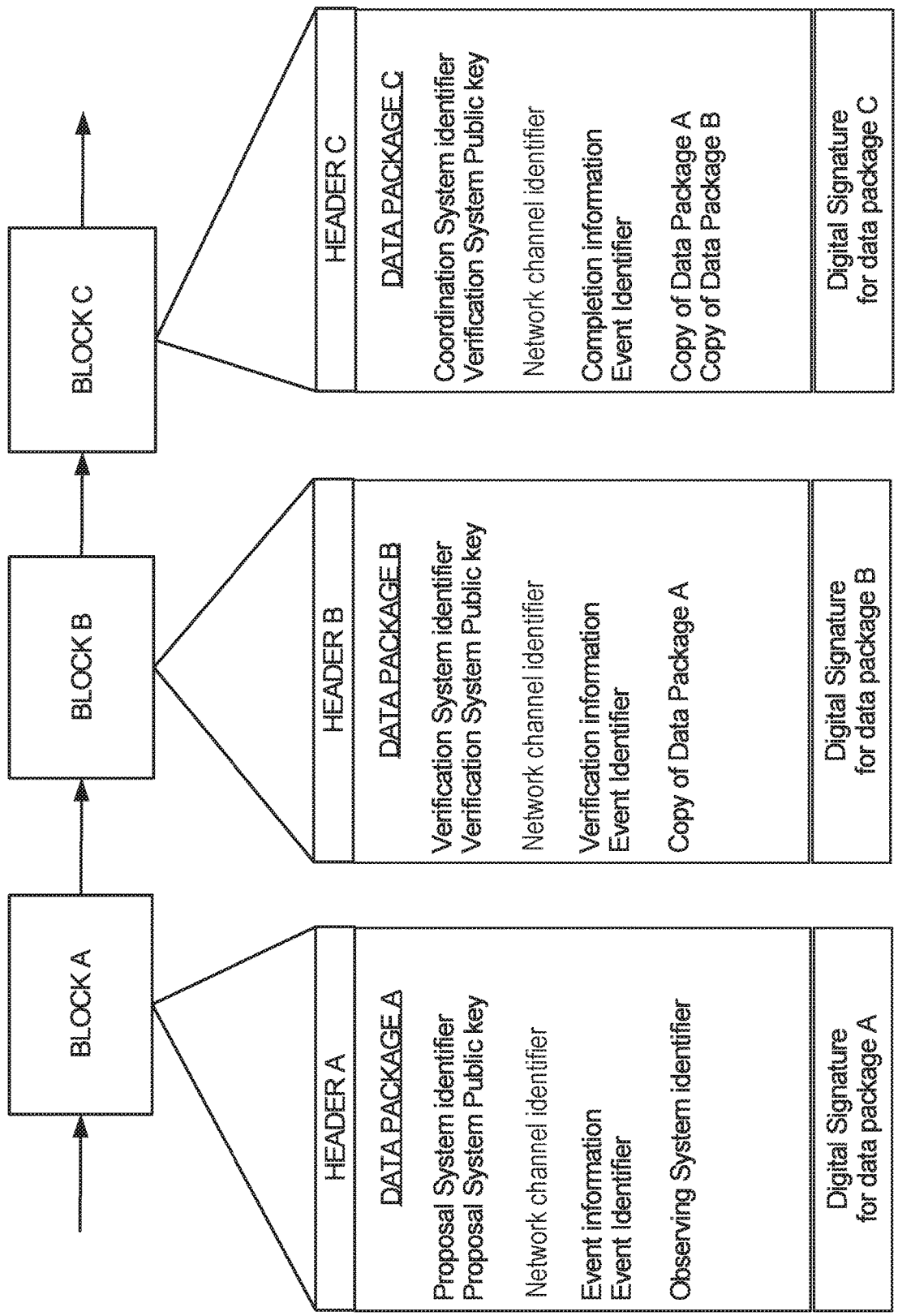
FIG. 4 shows an example of blocks in a blockchain, according to an embodiment of the invention.
Figure 5A:
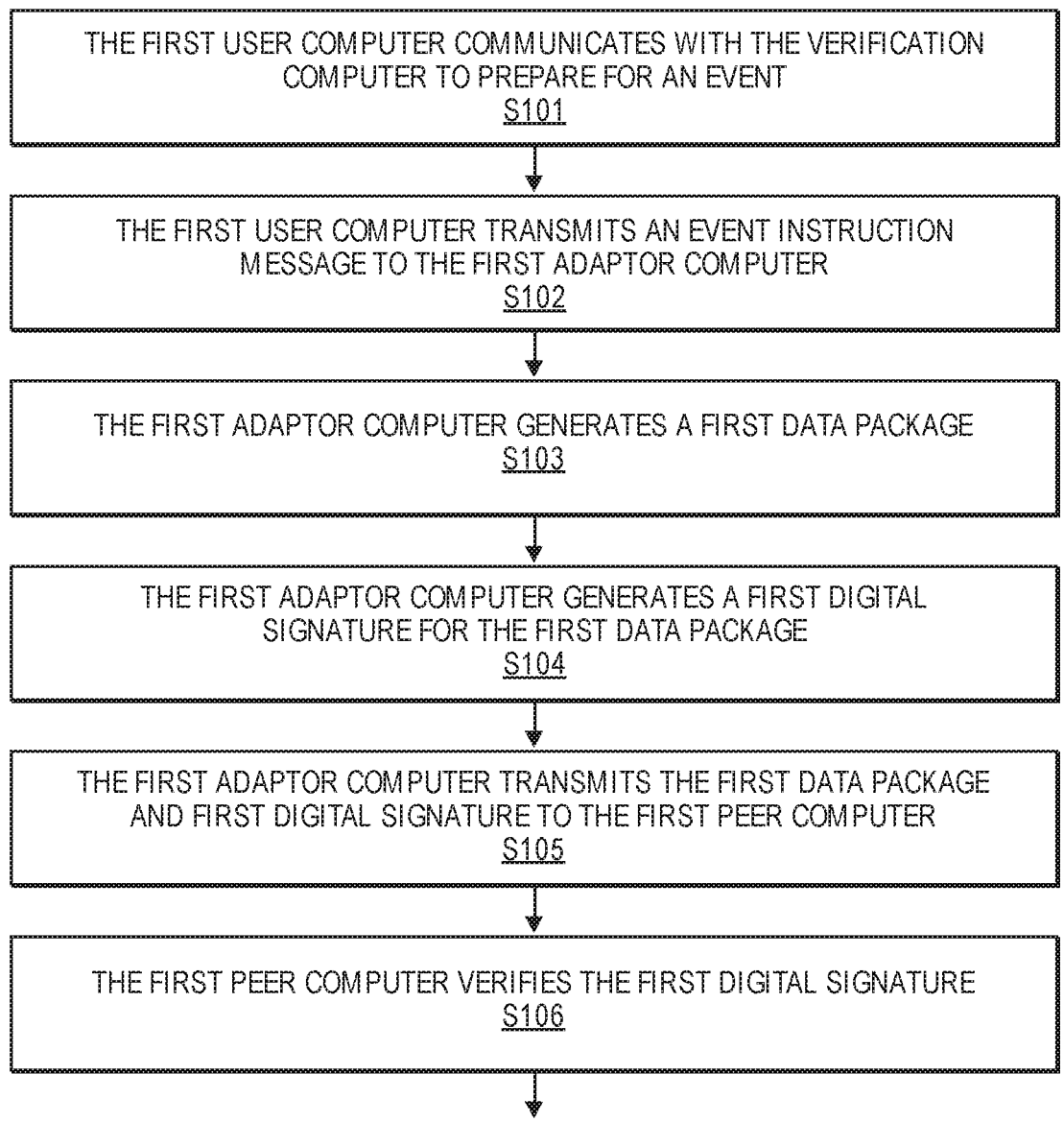
FIGS. 5A-5G shows a flow diagram illustrating a method for verifying an event and recording event statuses through multiple blockchain record entries, according to embodiments of the invention.
Figure 5B:
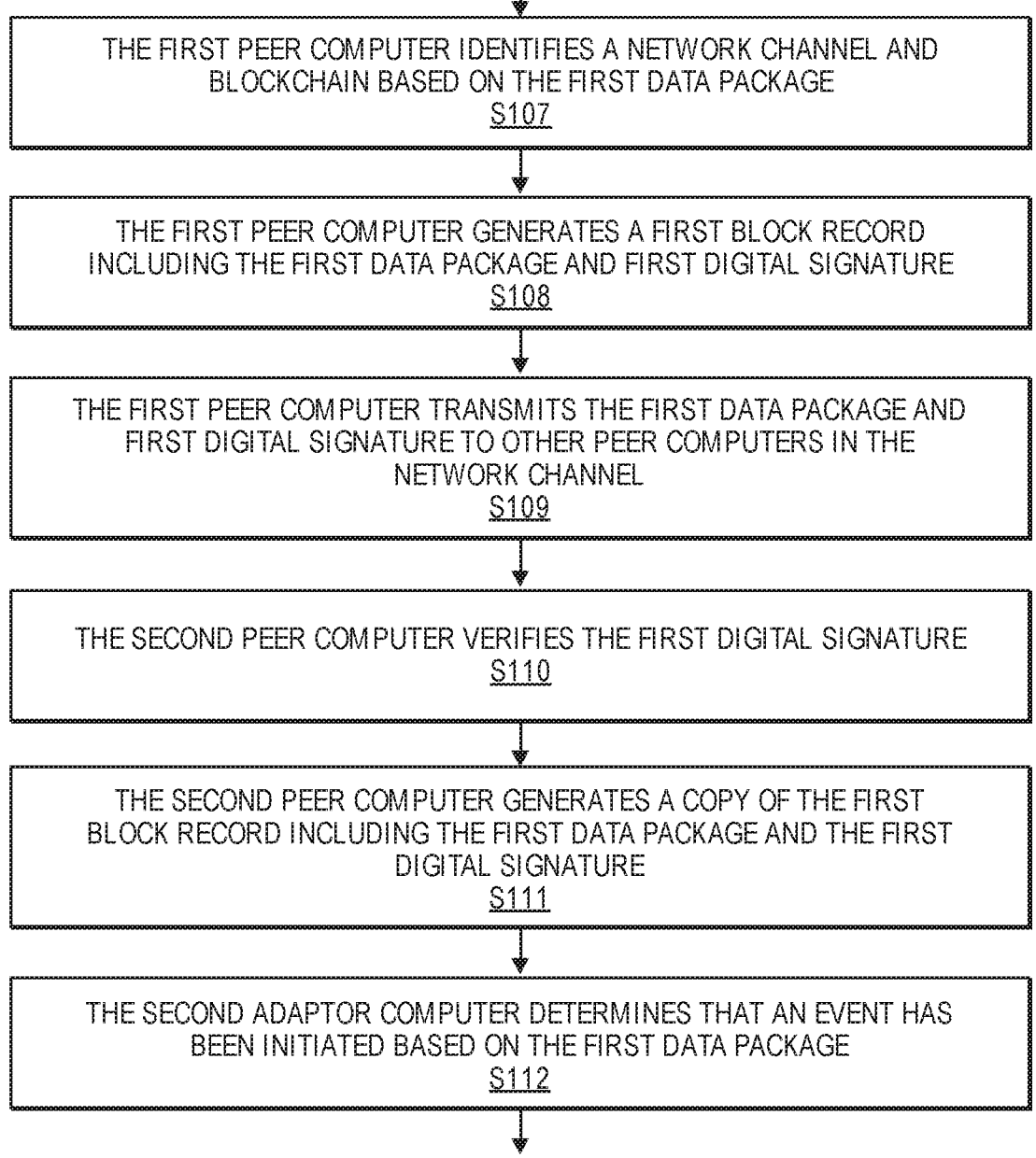
Figure 5C:
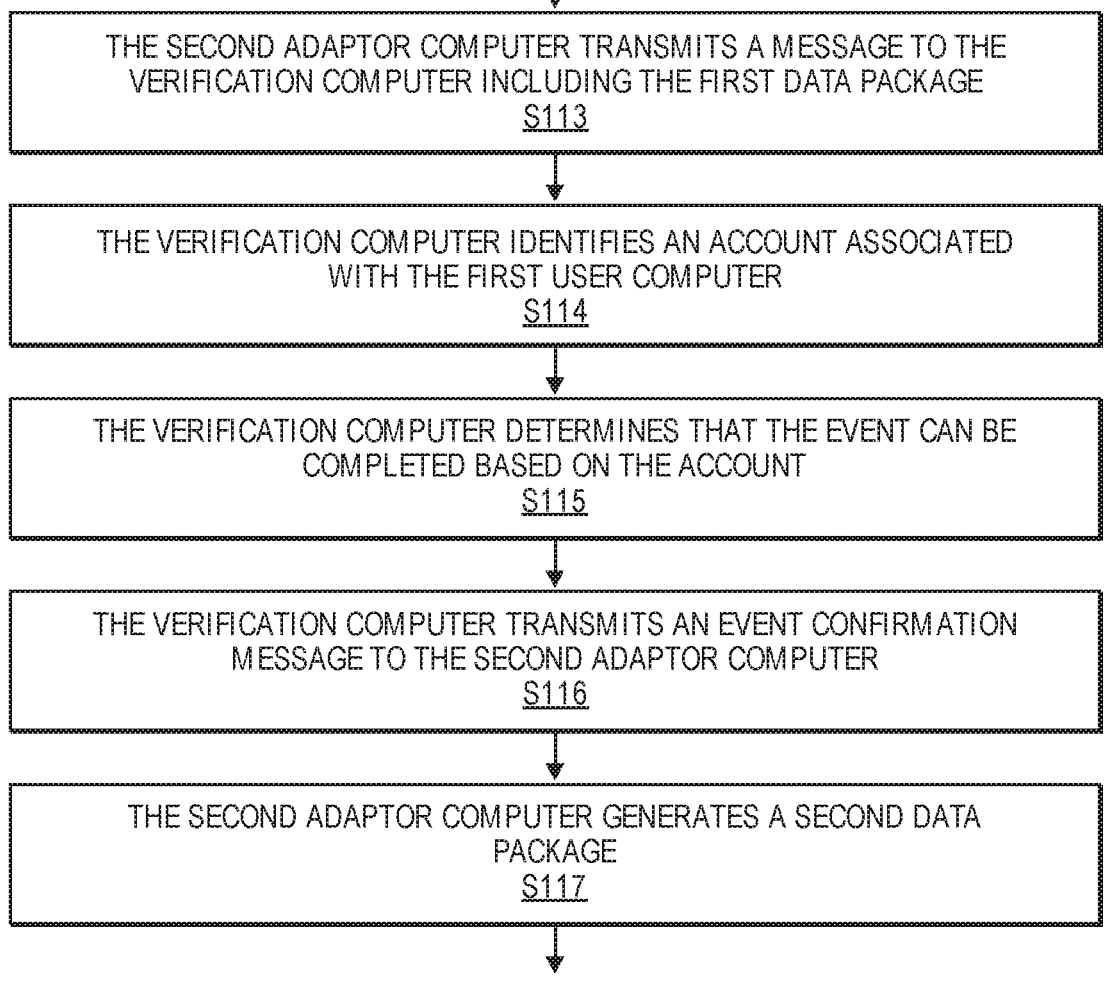
Figure 5D:
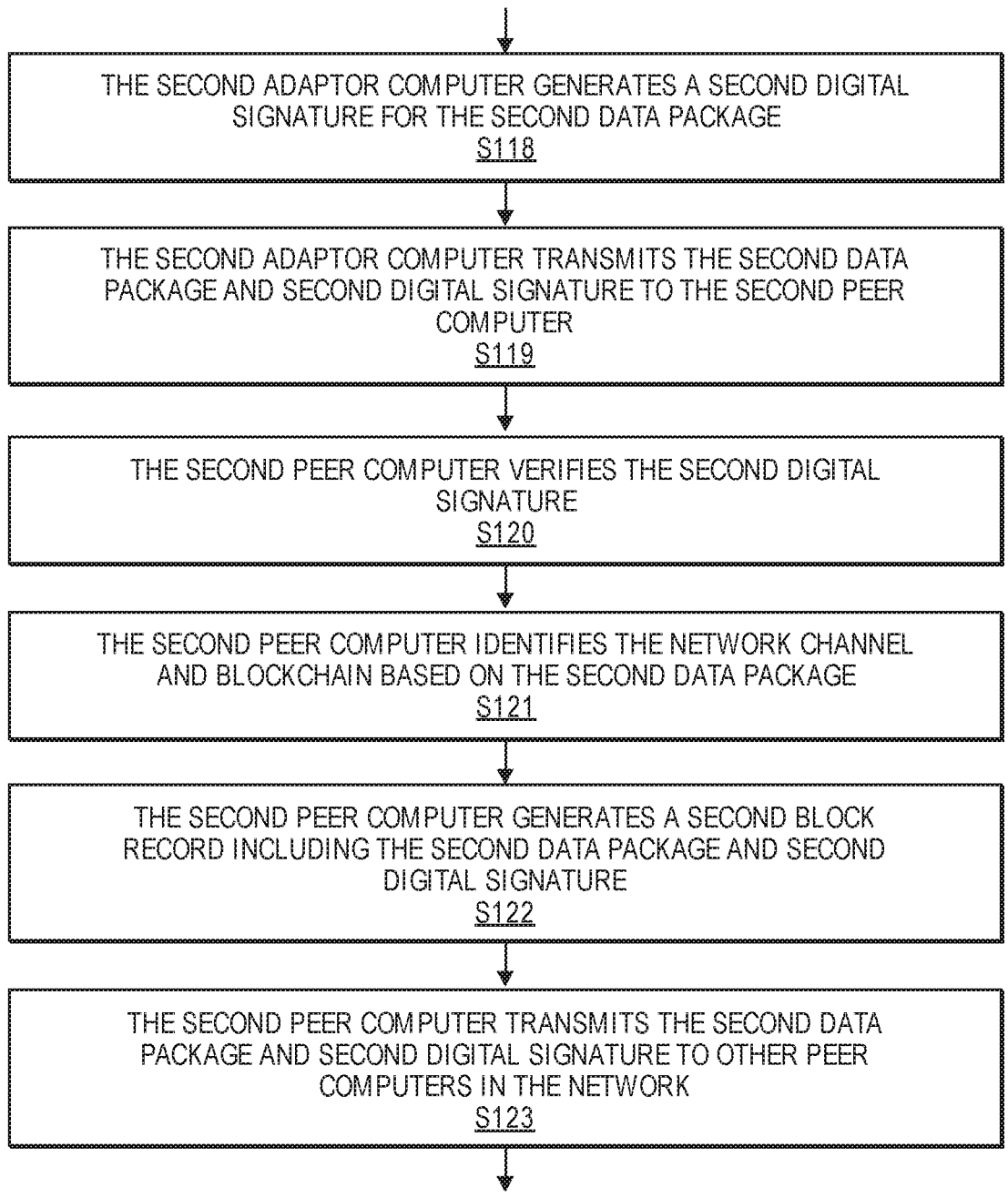
Figure 5E:
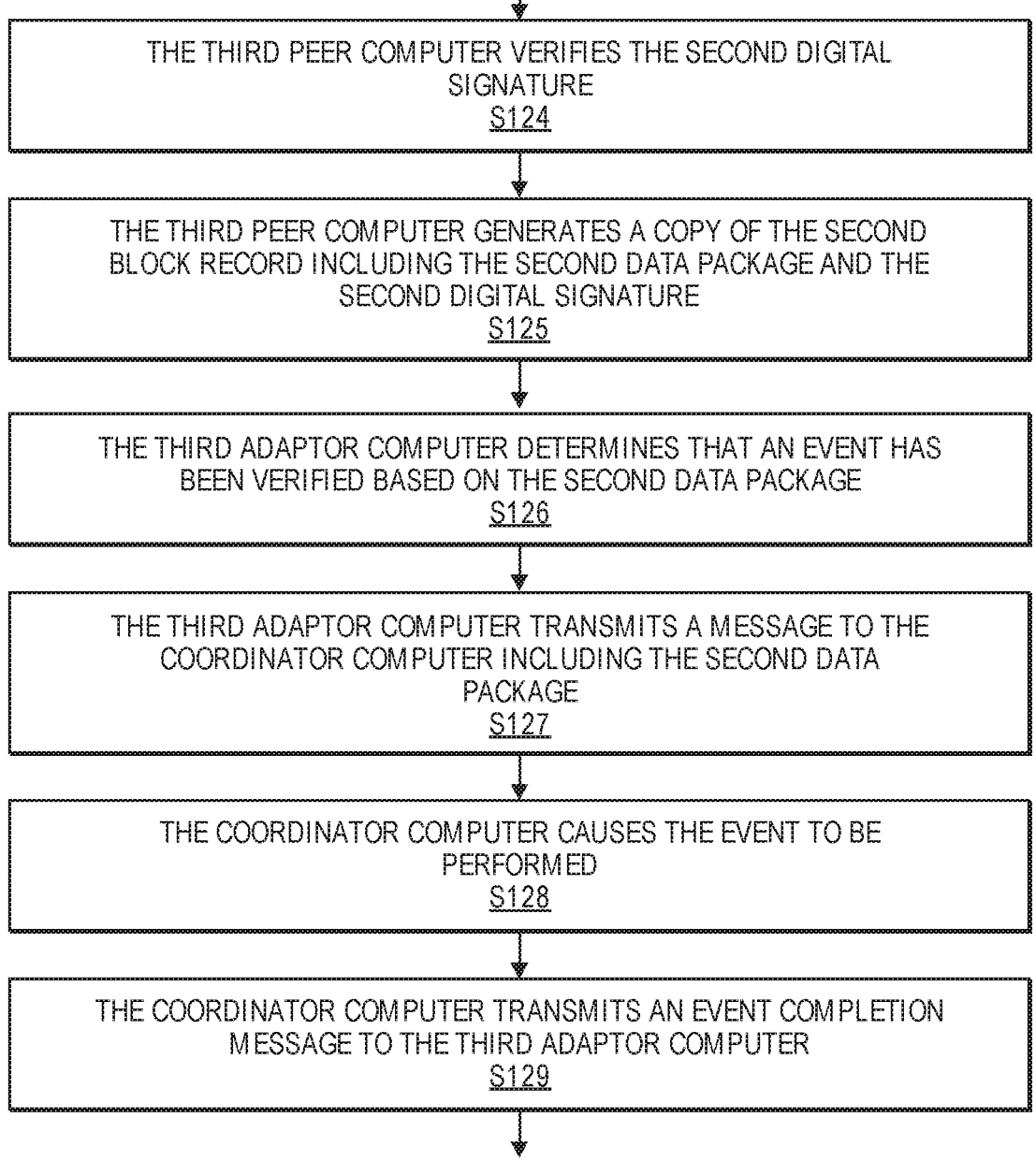
Figure 5F:
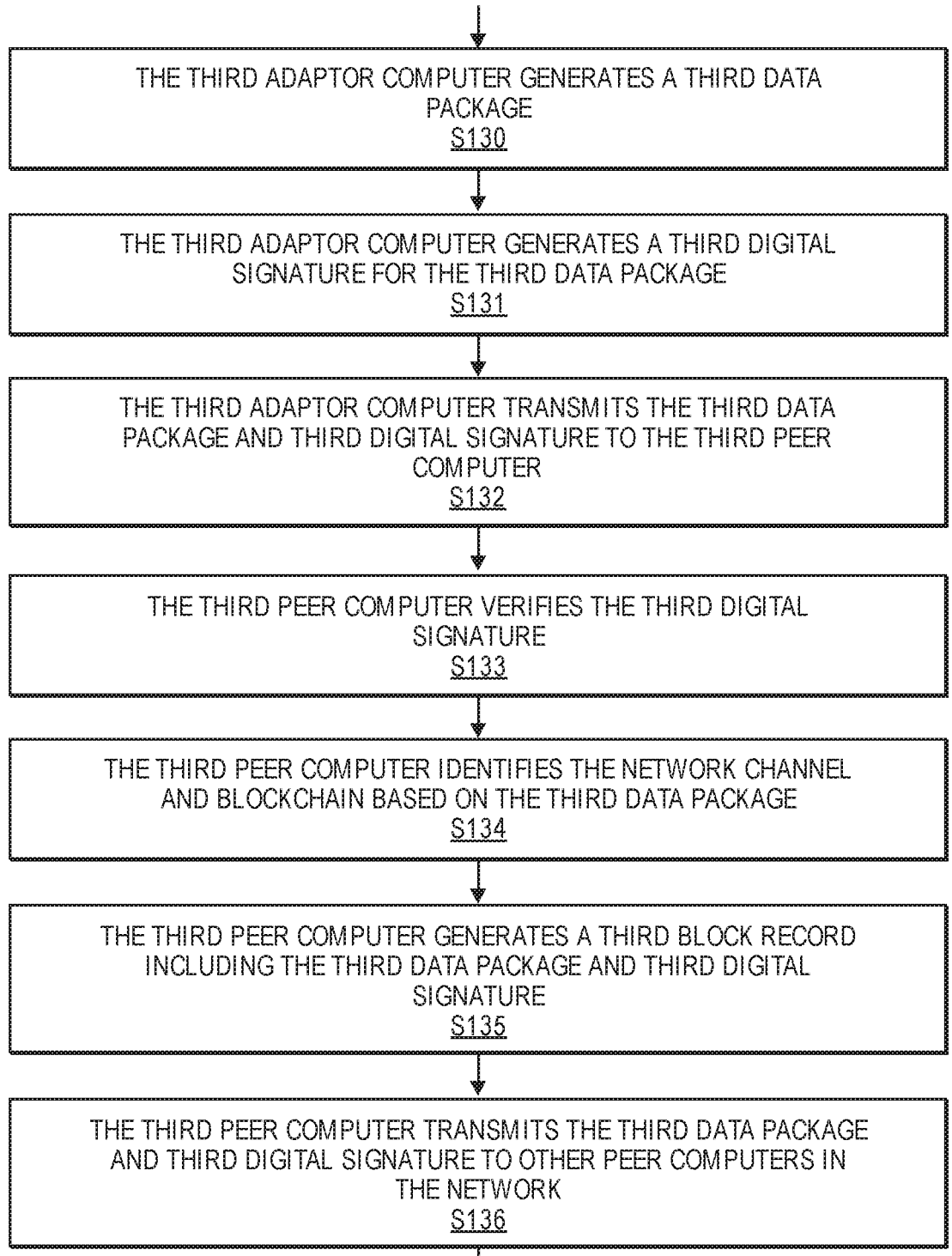
Figure 5G:
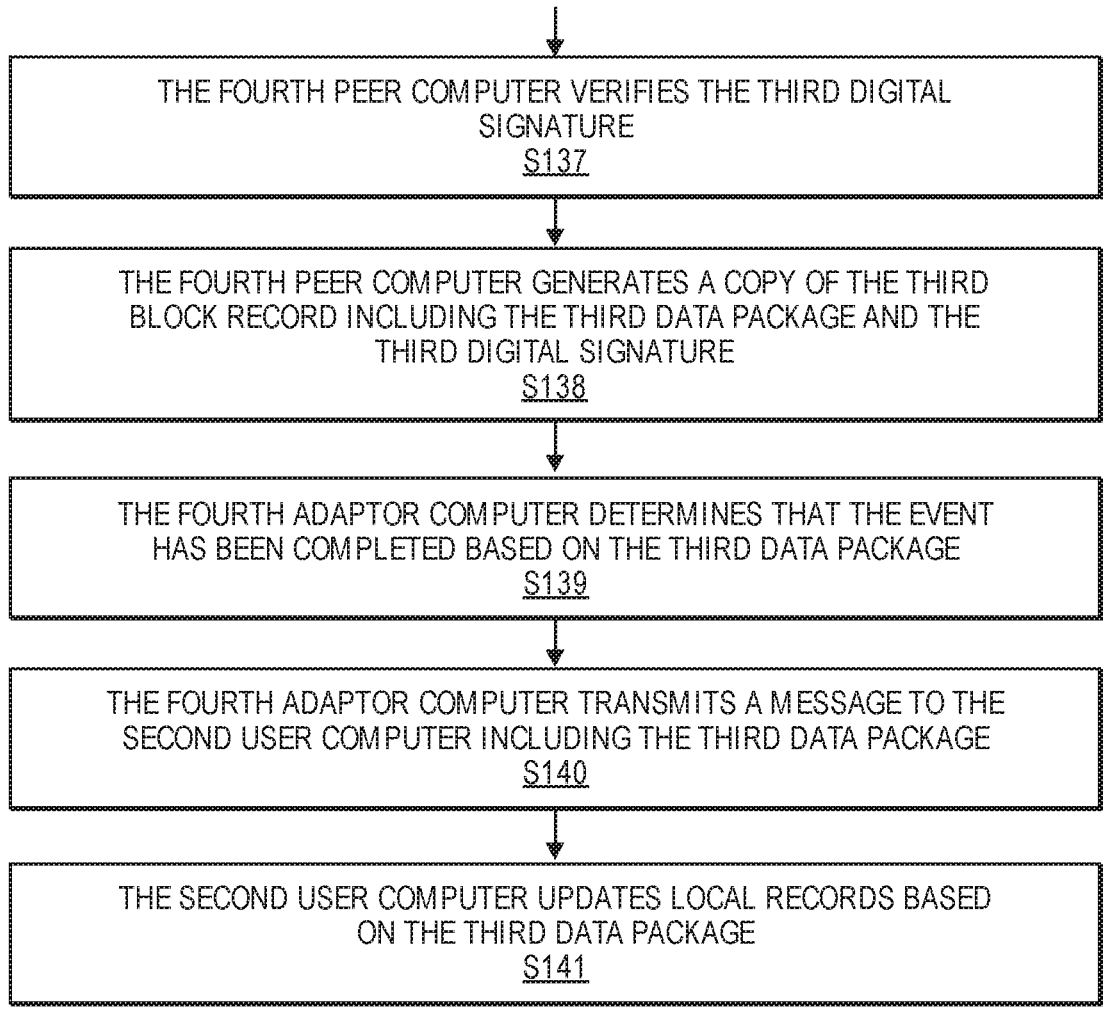

FIG. 4 shows an example of the information stored in a blockchain block. Block A, block B, and block C are shown and expanded to demonstrate some of the information that can be included in a block and data package. This example blockchain shows three blocks. However, additional blocks can be included before block A and after block C, and additional blocks can be between blocks A, B, and C. Additionally, each block in FIG. 4 includes one data package, a corresponding digital signature, and a hash header for the block. However, a block can include additional data packages (e.g., with information pertaining to other events).

Each block can include a block header, a data package, and a digital signature for the data package. Each data package includes information related to an event and/or event status. For example, the data package A in block A can include event information regarding a new event, and a corresponding event identifier. Additionally, data package A can include information about the system, peer, and/or endpoint computer that submitted the data package. This can include one or more proposal system identifiers, and a corresponding public key. Data package A can also include information about another system, peer, and/or endpoint computer with which the event and data package are associated, such as a payment recipient. This can include one or more observing system identifiers. The data package can further include other suitable information, such as a network channel identifier (or a corresponding blockchain identifier) and/or other data described above.

A subsequent data package in a subsequent block can include additional information concerning the same event, such as an updated event status. For example, the data package B in block B can include verification information regarding the same event, as indicated by the same event identifier. Additionally, data package B can include information about the system, peer, and/or endpoint computer that submitted the data package. This can include one or more verification system identifiers, and a corresponding public key (e.g., for verifying a digital signature also included in block B). Data package B can also include information about other systems, peers, and/or endpoint computers with which the event and data package are associated, such as the network channel identifier (or blockchain identifier). The data package B can further include other suitable information, such as a copy of the data package A (e.g., or some of the data from data package A).

A further subsequent data package in a further subsequent block can include additional information concerning the same event, such as a further updated event status. For example, the data package C in block C can include completion information regarding the same event, as indicated by the same event identifier. Additionally, data package C can include information about the system, peer, and/or endpoint computer that submitted the data package. This can include one or more coordination system identifiers, and a corresponding public key (e.g., for verifying a digital signature also included in block C). Data package C can also include information about other systems, peers, and/or endpoint computers with which the event and data package are associated, such as the network channel identifier (or blockchain identifier). The data package C can further include other suitable information, such as a copies of the data package A and/or data package B (e.g., or some of the data from data package A and/or data package B).

Embodiments allow a block to include additional information beyond a data package, such as a reference to a previous block (e.g., a previous block header), a timestamp, a random number, a hash of record information, etc. For example, each block may include or be appended to a hash of the previous block. In some embodiments, a block header may include data elements including version numbers, previous block hashes, merkle roots, and timestamps. For example, in some embodiments, a header may be a hash of information from the current block (e.g., a data package), information from the previous block (e.g., a data package and/or a header), and/or any other suitable information. The hash may be unique to that block entry on the blockchain, such that no other entries are associated with that hash.

In some embodiments, data packages from multiple different network channels can be recorded into a single blockchain. Accordingly, within such a combined blockchain, a network channel identifier (and/or blockchain identifier) included in a data package can demonstrate with which network channel the data package is associated.

A method 500 according to embodiments of the invention can be described with respect to FIGS. 5A-5G. Some elements in other Figures are also referred to. The steps shown in the method 500 may be performed sequentially or in any suitable order in embodiments of the invention. In some embodiments, one or more of the steps may be optional.

The various messages described below may use any suitable form of communication. In some embodiments, a request or response may be in an electronic message format, such as an e-mail, a short messaging service (SMS) message, a multimedia messaging service (MMS) message, a hypertext transfer protocol (HTTP) request message, a transmission control protocol (TCP) packet, a web form submission. The request or response may be directed to any suitable location, such as an e-mail address, a telephone number, an internet protocol (IP) address, or a uniform resource locator (URL). In some embodiments, a request or response may comprise a mix of different message types, such as both email and SMS messages.

The method 500 concerns the recording, distribution, and verification of an event. For discussion purposes, the event will be primarily described below as a payment transaction. However, embodiments allow information for any other suitable type of event to be submitted, recorded, and verified.

At step S101, the first user computer 110 communicates with the verification computer 120 to prepare for an event. For example, the first user computer 110 can communicate in order to provide funds to a settlement account at the verification computer 120, such that a future transaction can be completed. The verification computer 120 may receive funds from the first user computer 110, and may update local records to indicate that a first settlement account associated with the first user computer 110 has a certain balance of funds.

At step S102, the first user computer 110 generates and transmits an event instruction message to the first adaptor computer 160A. For example, the first user computer 110 can submit an instruction to send a payment to the second user computer 140. The event instruction message can include any suitable type of event information, such as a payment amount, an origin currency type, a destination currency type, an indication that the first user computer 110 is a payment sender (e.g., as indicated by a first user computer identifier), an indication that the second user computer 140 is a payment recipient (e.g., as indicated by a second user computer identifier), a specific settlement account from which to draw funds, and/or a specific settlement account to which to deposit funds. In one example, the first user may wish to send a payment of $1000 in Singapore dollars to the second user, but the first user may wish to make the payment from an account with US dollars. Based on exchange rates and/or fees, this may require $779 USD.

At step S103, the first adaptor computer 160A generates a first data package associated with the event. The first data package can include the event information received from the first user computer 110. The first data package can also include additional event information, such as an event identifier.

The event identifier can be unique within the current network channel, or within all network channels. In some embodiments, the first adaptor computer 160A can generate the event identifier. In other embodiments, the first adaptor computer 160A can obtain an event identifier (e.g., the next sequential event identifier for the network channel) from another computer, such as a peer computer.

The first data package can also include information about the network channel, such as identifiers for each peer in the network channel, and/or a network channel identifier (or a blockchain identifier). For example, the first adaptor computer 160A can identify a network channel (e.g., via a locally stored lookup table) based on the identity of the payment sender (e.g., the first user computer 110) and/or the identity of the payment receiver (e.g., the second user computer 140). The network channel involving both the first user computer 110 and the second user computer 140 may include any suitable number of peer computers. In this example, the network channel includes the first peer computer 150A associated with the first user computer 110, the second peer computer 150B associated with the verification computer 120, the third peer computer 150C associated with the coordinator computer 130, and the fourth peer computer 150D associated with the second user computer 140. Accordingly, the first data package can include identifiers for each of the first peer computer 150A, the second peer computer 150B, the third peer computer 150C, and the fourth peer computer 150D.

At step S104, the first adaptor computer 160A generates a first digital signature for the first data package. For example, the first adaptor computer 160A can generate a first one-way hash using some or all of the information in the data package, and then encrypt the first hash using a private key (e.g., a first private key associated with the first user computer 110 and/or the first adaptor computer 160A). The first hash value and/or first digital signature may be attached to the first data package, thereby making the first data package data-tampering evident. The presence of the first digital signature can serve as evidence that the first user computer 110 initiated the event and agrees with the information in the first data package.

At step S105, the first adaptor computer 160A transmits the first data package, the first digital signature, and/or the first hash value to the first peer computer 150A for entering into a blockchain record and for distribution.

At step S106, the first peer computer 150A verifies the first digital signature. For example, the first peer computer 150A may verify the first digital signature using a first public key associated with the first adaptor computer 160A. The first public key may also be associated with the first peer computer 150A and/or the first user computer 110 (e.g., as indicated in a lookup table shared within the network channel). Additionally, the first peer computer 150A may generate another hash value based on the data package and check that the new hash value matches the received hash value. The first peer computer 150A can reject the data package if the hash or digital signature cannot be verified.

At step S107, the first peer computer 150A identifies a network channel and a specific corresponding blockchain based on the data package. In some embodiments, the network channel and corresponding blockchain can be determined based on the second user computer's identifier, the first user computer's identifier, and/or a network channel identifier in the data package. The first peer computer 150A may participate in multiple network channels, and may store multiple blockchains (e.g., corresponding to different network channels). Accordingly, the first peer computer 150A can identify the correct network channel and blockchain for the current data package in order to continue with processing the data package.

At step S108, the first peer computer 150A can store the first data package in a record. For example, the first peer computer 150A can generate a first block for a blockchain, the block including the first data package, the first digital signature, and/or the first hash value (e.g., along with one or more other new data packages and corresponding digital signatures).

While referred to as a "first" block, this may not be the very first block for the entire blockchain. Instead, it can be referred to as "first" block because it is the first block in this method with information related to the new event being submitted by the first user computer 110.

At step S109, the first peer computer 150A transmits a copy of the first data package, the first digital signature, and/or the first hash value to other peer computers in the network channel in order to inform the other peer computers about the new event. For example, the first peer computer 150A can transmit the first data package and first digital signature to the second peer computer 150B, the third peer computer 150C, and/or the fourth peer computer 150D. From the perspective of other peers in the network, this initial event-related communication can be considered an event proposal. Subsequent steps in the method can be performed to evaluate and then execute the event.

In some embodiments, instead of transmitting the first data package alone, the first peer computer 150A can transmit a copy of a new block (e.g., from step S108) including the first data package and one or more other data packages to the other peer computers. In some embodiments, the other peer computers in the network channel may be able to access and read the blockchain stored at the first peer computer 150A in order to determine when a new data package and/or blockchain block are created.

Each of the second peer computer 150B, the third peer computer 150C, and/or the fourth peer computer 150D can build and store a matching copy of the blockchain for the network channel. Accordingly, upon receipt of the first data package (and/or first block) from the first peer computer 150A, each other peer computer can update their own copies of the blockchain to include the first data package (and/or the first block). Additionally, the peer computers can communicate with another to achieve consensus about the new data package and/or block.

As a result, each peer computer and their associated endpoints can be informed that the event has been proposed. The notification can take place through an immutable blockchain record, such that the notification and record-building can take place at the same time through the same process. Further, the distribution of blockchain update data can trigger a subsequent step in the event process, such as verification of the event as described below.

Specifically concerning the second peer computer 150B, at step S110, the second peer computer 150B verifies the first digital signature (e.g., similar to step S106). Then, at step S111, the second peer computer 150B can update its local records by storing the first data package in a record. For example, similar to step S107, the second peer computer 150B can generate a copy of the first block for a local copy of the blockchain, the copy of the first block including the first data package, the first digital signature, and/or the first hash value. Similar steps can also be performed by the third peer computer 150C and/or the fourth peer computer 150D.

The second adaptor computer 160B can monitor the blockchain records stored at the second peer computer 150B in order to determine when a new event has been initiated. For example, the second adaptor computer 160B can regularly check the blockchain for new data packages that include event information for a new event (e.g., an event that has not yet been verified). The first data package received from the first adaptor computer 160A and first peer computer 150A can be an example of such a data package. Accordingly, at step S112, the second adaptor computer 160B determines that an event has been initiated based on the first data package at the second peer computer 150B.

At step S113, the second adaptor computer 160B transmits a message to the verification computer 120 including the first data package. The verification computer 120 can then verify that the event, as described by the event information in the first data package, can be completed. For example, the verification computer 120 can determine that resources (e.g., funds, personnel, time, equipment) have been set aside for the event by the first user computer 110.

In the example of a payment transaction, the verification computer 120 may be a settlement computer associated with a settlement bank. Such a settlement computer can check a first user settlement account to determine whether sufficient funds are available to complete the payment transaction. Accordingly, in this example, at step S114, the verification computer 120 identifies an account associated with the first user computer 110. Embodiments allow the verification computer 120 to identify an account associated with a first user identifier, or to identify an account based on a specific account identifier included in the first data package. Then, the verification computer 120 can determine that the account has been funded sufficiently to complete the transaction (e.g., the account has a higher value than the payment transaction amount). Accordingly, at step S115, the verification computer 120 can determine that the event can be completed based on the account.

At step S116, the verification computer 120 transmits an event confirmation message to the second adaptor computer 160B. The event confirmation message can indicate that the event has been verified and can be completed. The event confirmation message can also serve as an instruction to generate a second data package. Communications about the event between the verification computer 120 and second adaptor computer 160B can include the event identifier and/or the first data package, such that messages can clearly indicate one specific event.

At step S117, the second adaptor computer 160B generates a second data package associated with the event. The second data package can include an indication that the event has been verified and can be completed. In some embodiments, the second data package can also include a confidence value (e.g., between 1 and 100), which represents the likelihood that the event will be completed.

In addition to a verification indicator, the second data package can also include the event identifier. The same event identifier can serve as a connection between the first data package and the second data package, such that one can determine that the first data package and the second data package are associated with the same event.

In some embodiments, the second data package can also include the event information from the first data package, such that all of the information is together in one place. For example, the second data package can include information about the network channel, such as identifiers for each peer in the network. Such network information can be obtained from the first data package, or determined in a similar manner as described above for step S103.

At step S118, the second adaptor computer 160B generates a digital signature for the second data package. This digital signature can be referred to as a "second" digital signature herein, in order to distinguish it from the first digital signature for the first data package, discussed above. The second adaptor computer 160B can generate a second one-way hash using some or all of the information in the second data package, and then encrypt the second hash using a private key (e.g., a second private key associated with the verification computer 120 and/or the second adaptor computer 160B). The second hash value and/or second digital signature may be attached to the second data package, thereby making the second data package data-tampering evident. The presence of the second digital signature can serve as evidence that the verification computer 120 has authentically verified the event and agrees with the information in the second data package.

At step S119, the second adaptor computer 160B transmits the second data package, the second digital signature, and/or the second hash value to the second peer computer 150B for entering into a blockchain record and for distribution.

At step S120, the second peer computer 150B verifies the second digital signature. For example, the second peer computer 150B may verify the second digital signature using a second public key associated with the second adaptor computer 160B. The second public key may also be associated with the second peer computer 150B and/or the verification computer 120 (e.g., as indicated in a lookup table shared within the network channel). Additionally, the second peer computer 150B may generate another hash value based on the data package and check that the new hash value matches the received hash value. The second peer computer 150B can reject the data package if the hash or digital signature cannot be verified.

At step S121, the second peer computer 150B identifies the network channel and the corresponding channel-specific blockchain based on the second data package. In some embodiments, the second peer computer 150B can use the event identifier to determine the network channel and corresponding blockchain (e.g., via a lookup table including an entry for the event identifier). In other embodiments, the second peer computer 150B can determine the network channel and corresponding blockchain based on information included in the second data package and/or the first data package, such as the second user computer's identifier, the first user computer's identifier, and/or a network channel identifier (or blockchain identifier). The second peer computer 150B may participate in multiple network channels, and may store multiple blockchains (e.g., corresponding to different channels). Accordingly, the second peer computer 150B can identify the correct network channel and blockchain for the current data package in order to continue with processing the data package.

At step S122, the second peer computer 150B can store the second data package in a record. For example, the second peer computer 150B can generate a second block for a blockchain, the block including the second data package, the second digital signature, and/or the second hash value (e.g., along with one or more other new data packages and corresponding digital signatures).

While referred to as a "second" block, this may not be the second block for the entire blockchain, and within the blockchain it may not immediately follow the first block from step S111 (e.g., additional interceding blocks with other data packages may have been created while the current event was being verified). Instead, it can be referred to as "second" block because it is the second block in this method with information related to the new event being submitted by the first user computer 110 and verified by the verification computer 120.

At step S123, the second peer computer 150B transmits a copy of the second data package, the second digital signature, and/or the second hash value to other peer computers in the network channel in order to inform the other peer computers that the event has been verified. For example, the second peer computer 150B can transmit the second data package and second digital signature to the third peer computer 150C, the fourth peer computer 150D, and/or the first peer computer 150A. In some embodiments, instead of transmitting the second data package alone, the second peer computer 150B can transmit a copy of a new block (e.g., from step S122) including the second data package and one or more other data packages to the other peer computers. In some embodiments, the other peer computers in the network channel may be able to access and read the blockchain stored at the second peer computer 150B in order to determine when a new data package and/or blockchain block are created.

As mentioned above, each of the first peer computer 150A, the second peer computer 150B, the third peer computer 150C, and/or the fourth peer computer 150D can build and store a matching copy of the blockchain for the network channel. Accordingly, upon receipt of the second data package (and/or second block) from the second peer computer 150B, each other peer computer can update their own copies of the blockchain to include the second data package (and/or the second block). Additionally, the peer computers can communicate with another to achieve consensus about the new data package and/or block.

As a result, each peer computer and their associated endpoints can be informed that the event has been verified. The notification can take place through an immutable blockchain record, such that the notification and record-building can take place at the same time through the same process. Further, the distribution of blockchain update data can trigger a subsequent step in the event process, such as execution of the event as described below.

Specifically concerning the third peer computer 150C, at step S124, the third peer computer 150C verifies the second digital signature (e.g., similar to step S120). Then, at step S125, the third peer computer 150C can update its local records by storing the second data package in a record. For example, similar to step S121, the third peer computer 150C can generate a copy of the second block for a local copy of the blockchain, the copy of the second block including the second data package, the second digital signature, and/or the second hash value. Similar steps can also be performed by the first peer computer 150A and/or the fourth peer computer 150D.

The third adaptor computer 160C can monitor the blockchain records stored at the third peer computer 150C in order to determine when an event has been verified by the verification computer 120. For example, the third adaptor computer 160C can regularly check the blockchain for new data packages that include a verification indicator. The second data package received from the second adaptor computer 160B and second peer computer 150B can be an example of such a data package. The network channel can be configured such that, once an event has been verified as capable of being completed, the next party to act is the coordinator computer 130. For example, the coordinator computer 130 can coordinate the execution of the event. Accordingly, the third adaptor computer 160C can monitor for verified events that are now ready for execution. In this example, at step S126, the third adaptor computer 160C determines that an event has been verified as capable of being completed based on the second data package at the third peer computer 150C.

At step S127, the third adaptor computer 160C transmits a message to the coordinator computer 130 including the second data package. Then, at step S128, the coordinator computer 130 causes the event to be performed. The coordinator computer 130 can coordinate the execution of the event as described by the event information in the first data package and verified in the second data package. For example, the coordinator computer 130 can perform the event or instruct another entity or computer to complete the event.

In the example of a payment transaction, the coordinator computer 130 can transmit a settlement instruction message to an entity that can cause the payment value to be transferred from the first user account to the second user account, as indicated by the first data package. In some embodiments, these tasks can be performed by the verification computer 120 (e.g., because the verification computer 120 can be a settlement computer). Accordingly, the coordinator computer 130 can transmit a settlement instruction message to the verification computer 120, the settlement instruction message including some or all of the event information provided in the first data package and or the second data package.

In some embodiments, such communications between the coordinator system 130 and the verification computer 120 can take place through another communication channel, instead of through the peers computers. For example, the coordinator computer 130 can cause the third adaptor computer 160C to transmit a settlement instruction message to the verification API 125, which can then forward the settlement instruction message to the second adaptor computer 160B, which can then provide the settlement instruction message to the verification computer 120.

Having received the settlement instruction message, the verification computer 120 (or other suitable computer) can cause the transaction amount to be transferred and settled between the first user settlement account and the second user settlement account. For example, the first user settlement account may be debited $779 USD, and the second user settlement account may be credited $1000 SGD. When the payment transaction is settled, the verification computer 120 can transmit a completion message back to the coordinator computer 130 (e.g., through the second adaptor computer 160B, the verification API 125, and/or the third adaptor computer 160C).

In some embodiments, batch settlement and/or multilateral settlement techniques can be used. For example, the coordinator computer 130 may calculate a net position between the first user and second user based on multiple transactions (e.g., from multiple data packages) that have taken place between the first user and second user during the day. Then, the coordinator computer 130 can send one settlement instruction message based on the net position at the end of the day.

At step S129, the coordinator computer 130 transmits an event completion message to the third adaptor computer 160C. The event completion message can indicate that the event has been successfully completed. The event completion message can also serve as an instruction to generate a third data package. Communications about the event between the coordinator computer 130 and third adaptor computer 160C can include the event identifier, the first data package, and/or the second data package such that messages can clearly indicate one specific event.

At step S130, the third adaptor computer 160C generates a third data package associated with the event. The third data package can include an indication that the event has been successfully completed. In some embodiments, the third data package can also include additional information about how and when the event was completed (e.g., a time and batch number).

In addition to a completion indicator, the second data package can also include the event identifier. The same event identifier can serve as a connection between the first data package, the second data package, and the third data package, such that one can determine that the first data package, the second data package, and the third data package are all associated with the same event.

In some embodiments, the third data package can also include the event information from the first data package and/or the verification indicator from the second data package, such that all of the information is together in one place. For example, the third data package can include information about the network channel, such as identifiers for each peer in the network. Such network information can be obtained from the first data package or second data package, or determined in a similar manner as described above for step S103.

At step S131, the third adaptor computer 160C generates a third digital signature for the third data package. This digital signature can be referred to as a "third" digital signature herein, in order to distinguish it from the first digital signature for the first data package and the second digital signature for the second data package, discussed above. The third adaptor computer 160C can generate a third one-way hash using some or all of the information in the third data package, and then encrypt the third hash using a private key (e.g., a third private key associated with the coordinator computer 130 and/or the third adaptor computer 160C). The third hash value and/or third digital signature may be attached to the third data package, thereby making the third data package data-tampering evident. The presence of the third digital signature can serve as evidence that the coordinator computer 130 has authentically completed the event and agrees with the information in the third data package.

At step S132, the third adaptor computer 160C transmits the third data package, the third digital signature, and/or the third hash value to the third peer computer 150C for entering into a blockchain record and for distribution.

At step S133, the third peer computer 150C verifies the third digital signature. For example, the third peer computer 150C may verify the third digital signature using a third public key associated with the third adaptor computer 160C. The third public key may also be associated with the third peer computer 150C and/or the coordinator computer 130 (e.g., as indicated in a lookup table shared within the network channel). Additionally, the third peer computer 150C may generate another hash value based on the data package and check that the new hash value matches the received hash value. The third peer computer 150C can reject the data package if the hash or digital signature cannot be verified.

At step S134, the third peer computer 150C identifies the network channel and the corresponding channel-specific blockchain based on the third data package. In some embodiments, the third peer computer 150C can use the event identifier to determine the network channel and corresponding blockchain (e.g., via a lookup table including an entry for the event identifier). In other embodiments, the third peer computer 150C can determine the network channel and corresponding blockchain based on information included in the third data package, the second data package, and/or the first data package, such as the second user computer's identifier, the first user computer's identifier, and/or a network channel identifier (or blockchain identifier). The third peer computer 150C may participate in multiple network channels, and may store multiple blockchains (e.g., corresponding to different channels). Accordingly, the third peer computer 150C can identify the correct network channel and blockchain for the current data package in order to continue with processing the data package.

At step S135, the third peer computer 150C can store the third data package in a record. For example, the third peer computer 150C can generate a third block for a blockchain, the block including the third data package, the third digital signature, and/or the third hash value (e.g., along with one or more other new data packages and corresponding digital signatures).

While referred to as a "third" block, this may not be the third block for the entire blockchain, and within the blockchain it may not immediately follow the second block from step S122 (e.g., additional interceding blocks with other data packages may have been created while the current event was being executed). Instead, it can be referred to as "third" block because it is the third block in this method with information related to the event being proposed by the first user computer 110, verified by the verification computer 120, and coordinated by the coordinator computer 130.

At step S136, the third peer computer 150C transmits a copy of the third data package, the third digital signature, and/or the third hash value to other peer computers in the network channel in order to inform the other peer computers that the event has been completed. For example, the third peer computer 150C can transmit the third data package and third digital signature to the first peer computer 150A, the second peer computer 150B, and/or the fourth peer computer 150D. In some embodiments, instead of transmitting the third data package alone, the third peer computer 150C can transmit a copy of a new block (e.g., from step S135) including the third data package and one or more other data packages to the other peer computers. In some embodiments, the other peer computers in the network channel may be able to access and read the blockchain stored at the third peer computer 150C in order to determine when a new data package and/or blockchain block are created.

As mentioned above, each of the first peer computer 150A, the second peer computer 150B, the third peer computer 150C, and/or the fourth peer computer 150D can build and store a matching copy of the blockchain for the network channel. Accordingly, upon receipt of the third data package (and/or third block) from the third peer computer 150C, each other peer computer can update their own copies of the blockchain to include the third data package (and/or the third block). Additionally, the peer computers can communicate with another to achieve consensus about the new data package and/or block.

As a result, each peer computer and their associated endpoints can be informed that the event has been executed and completed. The completion notification can take place through an immutable blockchain record, such that notification of completion and record-building can take place at the same time through the same process. Further, the distribution of blockchain update data can trigger a subsequent step in the event process, such as confirmation of the event as described below.

Specifically concerning the fourth peer computer 150D, at step S137, the fourth peer computer 150D verifies the third digital signature value (e.g., similar to step S133). Then, at step S138, the fourth peer computer 150D can update its local records by storing the third data package in a record. For example, similar to step S134, the fourth peer computer 150D can generate a copy of the third block for a local copy of the blockchain, the copy of the third block including the third data package, the third digital signature, and/or the third hash value. Similar steps can also be performed by the first peer computer 150A and/or the second peer computer 150B.

The fourth adaptor computer 160D can monitor the blockchain records stored at the fourth peer computer 150D in order to determine when an event has been coordinated and completed by the coordination computer 130. For example, the fourth adaptor computer 160D can regularly check the blockchain for new data packages that include an event completion indicator. The third data package received from the third adaptor computer 160C and third peer computer 150C can be an example of such a data package. The network channel can be configured such that, once an event has been verified as capable of being completed, the next party to act is the second user computer 140. For example, the second user computer 140 can update local records based on the completed event. Accordingly, the fourth adaptor computer 160D can monitor for completed events that can now be locally recognized. In this example, at step S139, the fourth adaptor computer 160D determines that an event has been successfully completed based on the third data package at the fourth peer computer 150D.

At step S140, the fourth adaptor computer 160D transmits a message to the second user computer 140 including the third data package. Then, at step S141, the second user computer 140 updates local records based on the third data package. The second user computer 140 can update records and perform any useful activities based on the new information that the event was completed. For example, in the case of a building that has been completed for the second user, the second user computer 140 can update a physical address and initiate a move from a previous building to the new building (e.g., by notifying employees and hiring professional movers).

In the example of a payment transaction, the second user computer 140 can update a local account balance based on the newly received value in the second user's settlement account. In some embodiments, this can include crediting the payment transaction value to a specific account holder's account (e.g., the account of a client with an account at a bank).

In some embodiments, the second user computer 140 can update local records at an earlier time. For example, the second user computer 140 may have sufficient assurance that the event will be completed when the verification computer 120 verifies the event and causes the second data package to be distributed. Accordingly, the second user computer 140 may update local records (e.g., credit an account holder's account) when the fourth peer computer 150D receives the second data package (e.g., instead of waiting for the third data package).

Embodiments allow additional data packages to be created and stored in the record for additional transaction status changes. For example, a data package can be created and recorded when the first user computer 110 provides funds for a settlement account, a data package can be created and recorded by the verification computer 120 when it initiates settlement, and/or a data package can be created and recorded by the second user computer 140 to inform the network that it has observed the transaction and received the funds.

Figure 6:
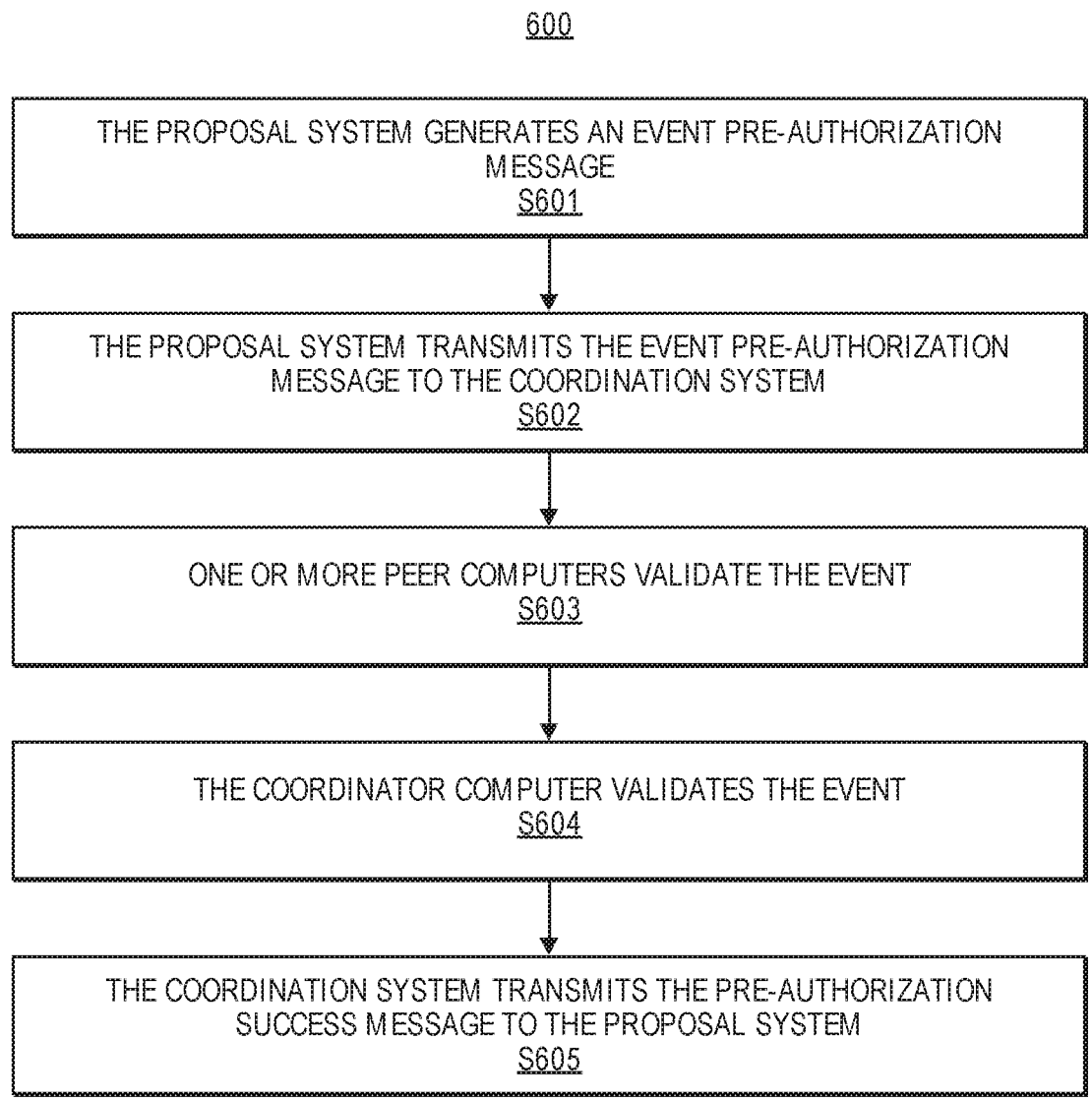
FIG. 6 shows a flow diagram illustrating a method for pre-authorization process, according to embodiments of the invention.

In some embodiments, before the method 500, steps can be taken in order to pre-authorize a transaction. These steps are included in another method 600 which can be described with respect to FIG. 6, according to embodiments of the invention. The steps shown in the method 600 may be performed sequentially or in any suitable order in embodiments of the invention. In some embodiments, one or more of the steps may be optional.

At step S601, the proposal system 111 can prepare an event pre-authorization message. For example, the first user computer 110 can generate an event pre-authorization message with event information for a proposed event. The first user computer 110 can transmit the event pre-authorization message to the first adaptor computer 160A, which can forward the event pre-authorization message to the first peer computer 150A. The proposal system 111 can also identify a network channel to utilize for the pre-authorization (e.g., based on a payment sender and payment receiver identified in the event information).

At step S602, the proposal system 111 can transmit the event pre-authorization message to the coordination system 131 (e.g., based on the identified network channel). For example, the first peer computer 150A can transmit the event pre-authorization message to the third peer computer 150C. In some embodiments, the peer computers may not store the event pre-authorization message in a blockchain or other record. Accordingly, the peer computers can serve as message transmission nodes, and may not serve as record-distributors during the event pre-authorization process.

At step S603, one or more peer computers can validate the event based on the event information. For example, the third peer computer 150C can determine that the proposed event does not violate any network channel rules (e.g., based on an established smart contract for the network channel).

At step S604, the coordinator computer 130 can validate the event based on the event information. For example, the coordinator computer 130 can determine that the first user has not exceeded any transaction spend or velocity thresholds.

At step S605, the third peer computer 150C can transmit a message back to the first peer computer 150A (and thereby the proposal system 111) indicating that the transaction has been successfully pre-authorized. In some embodiments, the first peer computer 150A and/or third peer computer 150C can create and/or distribute records (e.g., a blockchain block) indicating that the transaction has been pre-authorized. This can help to expedite the transaction proposal process in the method 500.

Figure 7:
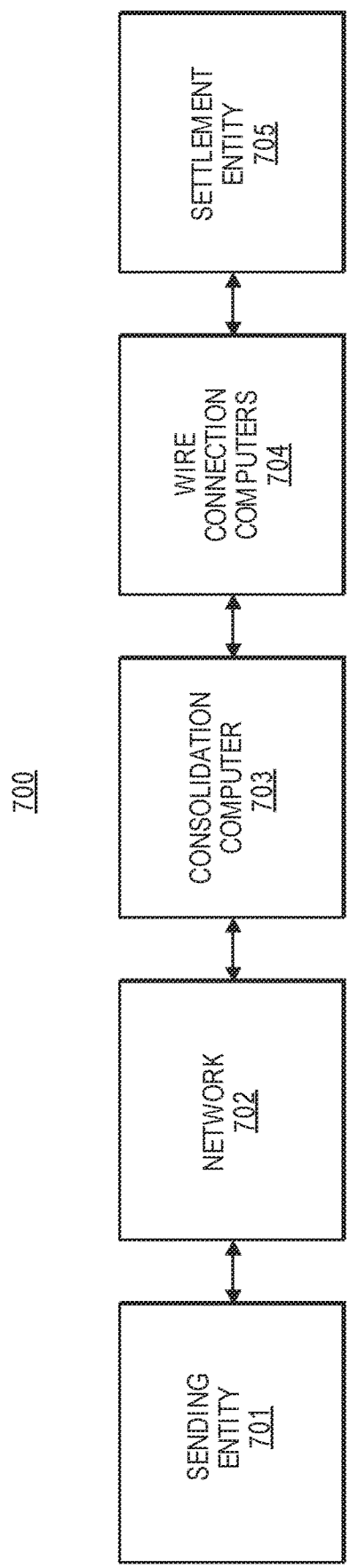
FIG. 7 shows a block diagram of an existing system.

Embodiments of the invention include a number of advantages over prior systems. For comparison, an example of a conventional system 700 is shown in FIG. 7. The system 700 shows a number of entities involved in a payment transaction process.

The sending entity 701 can be a sending bank that causes a payment to be sent to a receiving bank. The network 702 can be a transaction processing network, or more specifically one or more transaction processing computers that administrate the transaction processing network. The consolidation computer 703 can calculates net positions between banks, and it may be a part of the network 702 (e.g., a module in a transaction processing computer). The wire connection computers 704 can involve one or more computers associated with one or more intermediary banks and/or the receiving bank, where the computers can send wire communications to one another (e.g., using SWIFT messaging). The settlement entity 705 can be a settlement bank that manages a sending bank settlement account and/or a receiving bank settlement account.

For example, the sending bank can send a payment instruction to the transaction processing network for a payment from the sending bank to a receiving bank (not shown). The payment instruction may more specifically be from a payment from a first user's account at the sending bank to a second user's account at the receiving bank.

The transaction processing network can receive the payment instruction message from the sending bank and process the payment (e.g., by gaining approval or otherwise clearing the payment for settlement).

The transaction processing network can receive multiple payment instructions within a given time period (e.g., a day). The transaction processing network may forward each payment instruction to a consolidation computer, which can calculate a net position between the sending bank and the receiving bank based on a combination of payments for the time period.

At the end of a given time period (e.g., the end of the day), the consolidation computer can send wire messages to cause settlement of one or more transactions. For example, the consolidation computer can send a wire message to the receiving bank or a separate settlement bank, the wire message including the net transaction value between the sending bank and the receiving entity. In some embodiments, the wire message may be sent through one or more intermediary banks. In this case, each intermediary bank can include correspondent bank accounts, and the value can transfer and settle between each intermediary bank until it reaches the receiving bank.

The settlement bank or receiving bank can then cause the payment value to be settlement between the sending bank settlement account and the receiving bank settlement account.

While the system 700 allows payment transactions to take place, it has a number of problems. For example, there are many connections between the sending bank and the receiving bank. Also, the receiving bank and/or settlement bank are not involved and remain uninformed about the payment until the wire messages are received at the end of the process. In addition, the receiving bank has no way of checking in to learn about pending payments. This means that a specific payment value as well as any information about the payment does not reach the settlement bank and/or receiving bank until after a net position is calculated (e.g., at the end of the day), and/or after multiple wire communications and/or settlements between intermediary banks take place (which may take several more days). As a result, it is a slow payment process that involves many communication and processing steps. Also, if any of the intermediary banks or other communication connection points is disrupted, the payment may be further delayed or the payment may fail.

In contrast, embodiments of the invention have a number of advantages. For example, in embodiments of the invention, a verification system (e.g., a settlement bank) can be incorporated into an event (e.g., payment) processing network. As a result, the verification system can be informed of a new event immediately after it is proposed, can verify whether a new event can be completed as described, and can then inform the network about the verification results. For example, a settlement bank can verify that a payment sender has sufficiently funded a settlement account to enable the payment to take place. In some embodiments, updates from the verification system and other event processing-related communications are quickly distributed to each party associated with the network. Instead of sending multiple wire (e.g., SWIFT) messages across multiple intermediary banks, the sending bank, receiving bank, settlement bank, and/or transaction processing computers can all communicate directly with one another. In conventional systems, intermediary banks cause multiple steps of separation between a sending bank and settlement bank. Those steps cause increased processing loads for messaging, slower communications, and higher chance of payment failure (e.g., if an intermediary bank experiences an outage). In contrast, embodiments of the present invention remove some or all intermediaries, and thereby improve payment success rates, improve communication speed, and reduce processing loads.

Embodiments further advantageously enable a payment receiver (and other included parties) to be assured that a newly proposed payment transaction will take place before it is completed. This can enable certain entities, such as the payment receiver, to take further actions immediately instead of waiting for an event to be completed. For example, a receiving bank can credit an account holder's account upon receiving event verification.

Embodiments of the invention also advantageously communicate about an event (e.g., payment transaction) status through a blockchain network. For example, any change to an event status (e.g., initial event proposal, verification, and completion) can be submitted to a blockchain network and stored by one or more peers in the network. The act of distributing new records and achieving blockchain consensus can also serve to communicate updates about new event statuses. For example, the distribution of a new data package (e.g., in a blockchain network) can trigger the execution of a subsequent step in event-processing. As a result, two results (e.g., informing other network parties about status updates, and storing records) can be achieved through one process (e.g., blockchain update communications). This improves communication and network efficiency.

Additionally, communications with a settlement bank and between other participating banks can take place through the network without using wire communications (e.g., SWIFT).

Embodiments of the invention can also advantageously store event status updates in an immutable manner. For example, various event status updates can be stored in a distributed blockchain ledger, which can be embodied in an immutable format. As a result, network participants (e.g., a payment receiver) can be assured that received event status data is trustworthy and will not change.

Embodiments further advantageously enable a blockchain network to be divided into separate network channels. Each network channel can essentially function as a separate, private blockchain network. This allows transactions to be recorded in an immutable ledger, yet to remain private such that only the involved parties can view the ledger. This also opens up a direct communication line between a sending institution and a receiving institution, such that they can communicate with one another more directly instead of all communications passing through an intermediary such as a central administrator. Separated network channels also make each channel small enough to enable the network peers can communicate about transaction processing updates and achieve consensus.

A computer system will now be described that may be used to implement any of the entities or components described herein. Subsystems in the computer system are interconnected via a system bus. Additional subsystems include a printer, a keyboard, a fixed disk, and a monitor which can be coupled to a display adapter. Peripherals and input/output (I/O) devices, which can couple to an I/O controller, can be connected to the computer system by any number of means known in the art, such as a serial port. For example, a serial port or external interface can be used to connect the computer apparatus to a wide area network such as the Internet, a mouse input device, or a scanner. The interconnection via system bus allows the central processor to communicate with each subsystem and to control the execution of instructions from system memory or the fixed disk, as well as the exchange of information between subsystems. The system memory and/or the fixed disk may embody a computer-readable medium.

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A method comprising:
   receiving, by a verification system, from a computer in a blockchain network, a first data package for an event and a first digital signature associated with the first data package, the first data package including an event identifier and event information;
   verifying, by the verification system, the first digital signature using a public key;
   generating, by the verification system, a first block for a blockchain stored by the verification system, the first block including the first data package and the first digital signature;
   verifying, by the verification system, that the event can be completed based on the event information;
   in response to verifying that the event can be completed, generating, by the verification system, a second data package for the event, the second data package including the event identifier and information indicating that the event has been verified;
   generating, by the verification system, a second digital signature for the second data package using a private key associated with the verification system;
   generating, by the verification system, a second block for the blockchain, the second block including the second data package and the second digital signature; and
   transmitting, by the verification system, the second data package and the second digital signature to one or more computers in the blockchain network.

2. The method of claim 1, wherein a coordination system receives the second data package, wherein the coordination system determines that the event has been verified based on the second data package, and wherein the coordination system causes the event to take place in response to determining that the event has been verified.

3. The method of claim 2, wherein the coordination system causes the event to take place by transmitting a message to the verification system, and the method further comprising:
   receiving, by the verification system, from the coordination system, the message instructing the verification system to execute the event; and
   executing the event.

4. The method of claim 2, further comprising:
   receiving, by the verification system, from the coordination system, a third data package for the event and a third digital signature associated with the third data package, the third data package including the event identifier and information indicating the event has been completed;

verifying, by the verification system, the third digital signature using a second public key associated with the coordination system; and generating, by the verification system, a third block for the blockchain stored by the verification system, the third block including the third data package and the third digital signature.

5. The method of claim 1, wherein the blockchain network includes a plurality of peer computers, and wherein each peer computer builds and stores a copy of the blockchain.

6. The method of claim 5, wherein the private key is a second private key, wherein the first data package is received from a first peer computer of the plurality of peer computers, wherein the first digital signature was generated with a first private key associated with the first peer computer, and wherein the public key is a first public key associated with the first peer computer.

7. The method of claim 6, wherein verifying that the event can be completed includes:
identifying an account associated with the first peer computer; and
determining that the event as described by the event information can be completed based on the account.

8. The method of claim 6, wherein the verification system includes a verification computer, an adaptor computer, and a second peer computer of the plurality of peer computers.

9. The method of claim 8, wherein the plurality of peer computers compose a first blockchain network channel, wherein the blockchain is a first blockchain associated with the first blockchain network channel, wherein the second peer computer also participates in a second blockchain network channel, wherein the first blockchain network channel and the second blockchain network channel do not have the same set of peer computers, and wherein a second blockchain is associated with the second blockchain network channel, the second blockchain being different than the first blockchain.

10. The method of claim 1, wherein the event information includes a sender identifier and a receiver identifier.

11. A verification system comprising:
at least one processor; and
at least one non-transitory computer readable medium, the at least one non-transitory computer readable medium comprising code, executable by the processor, for implementing a method comprising:
receiving, from a computer in a blockchain network, a first data package for an event and a first digital signature associated with the first data package, the first data package including an event identifier and event information;
verifying the first digital signature using a public key;
generating a first block for a blockchain stored by the verification system, the first block including the first data package and the first digital signature;
verifying that the event can be completed based on the event information;
in response to verifying that the event can be completed, generating a second data package for the event, the second data package including the event identifier and information indicating that the event has been verified;
generating a second digital signature for the second data package using a private key associated with the verification system;

generating a second block for the blockchain, the second block including the second data package and the second digital signature; and transmitting the second data package and the second digital signature to one or more computers in the blockchain network.

12. The verification system of claim 11, wherein a coordination system receives the second data package, wherein the coordination system determines that the event has been verified based on the second data package, and wherein the coordination system causes the event to take place in response to determining that the event has been verified.

13. The verification system of claim 12, wherein the coordination system causes the event to take place by transmitting a message to the verification system, and the method further comprising:
receiving, from the coordination system, the message instructing the verification system to execute the event; and
executing the event.

14. The verification system of claim 12, further comprising:
receiving, from the coordination system, a third data package for the event and a third digital signature associated with the third data package, the third data package including the event identifier and information indicating the event has been completed;
verifying the third digital signature using a second public key associated with the coordination system; and
generating a third block for the blockchain stored by the verification system, the third block including the third data package and the third digital signature.

15. The verification system of claim 11, wherein the blockchain network includes a plurality of peer computers, and wherein each peer computer builds and stores a copy of the blockchain.

16. The verification system of claim 15, wherein the private key is a second private key, wherein the first data package is received from a first peer computer of the plurality of peer computers, wherein the first digital signature was generated with a first private key associated with the first peer computer, and wherein the public key is a first public key associated with the first peer computer.

17. The verification system of claim 16, wherein verifying that the event can be completed includes:
identifying an account associated with the first peer computer; and
determining that the event as described by the event information can be completed based on the account.

18. The verification system of claim 16, wherein the at least one processor includes a first processor, a second processor, and a third processor, and wherein the at least one non-transitory computer readable medium includes a first non-transitory computer readable medium, a second non-transitory computer readable medium, and a third non-transitory computer readable medium, and wherein the verification system further includes:
a verification computer including the first processor and the first non-transitory computer readable medium;
an adaptor computer that including the second processor and the second non-transitory computer readable medium; and
a second peer computer of the plurality of peer computers, the second peer computer including the third processor and the third non-transitory computer readable medium.

19. The verification system of claim 18, wherein the plurality of peer computers compose a first blockchain network channel, wherein the blockchain is a first blockchain associated with the first blockchain network channel, wherein the second peer computer also participates in a second blockchain network channel, wherein the first blockchain network channel and the second blockchain network channel do not have the same set of peer computers, and wherein a second blockchain is associated with the second blockchain network channel, the second blockchain being different than the first blockchain.

20. The verification system of claim 11, wherein the event information includes a sender identifier and a receiver identifier.

\* \* \* \* \*